United States Patent
Deguara

(10) Patent No.: US 10,535,055 B2
(45) Date of Patent: Jan. 14, 2020

(54) COLLABORATIVE BETTING PLATFORM

(71) Applicant: Exciting Holdings Pty Limited, Sydney (AU)

(72) Inventor: Damian Deguara, Mount Kuring-gai (AU)

(73) Assignee: Exciting Holdings Pty Limited, Sydney (AU)

( * ) Notice: Subject to any disclaimer, the term of this patent is extended or adjusted under 35 U.S.C. 154(b) by 129 days.

(21) Appl. No.: 15/737,110

(22) PCT Filed: Jun. 16, 2016

(86) PCT No.: PCT/AU2016/050507
§ 371 (c)(1),
(2) Date: Dec. 15, 2017

(87) PCT Pub. No.: WO2016/201515
PCT Pub. Date: Dec. 22, 2016

(65) Prior Publication Data
US 2018/0174128 A1    Jun. 21, 2018

(30) Foreign Application Priority Data

Jun. 16, 2015 (AU) ................................ 2015902302

(51) Int. Cl.
*G06F 19/00* (2018.01)
*G06Q 20/24* (2012.01)
(52) U.S. Cl.
CPC .................................. *G06Q 20/24* (2013.01)
(58) Field of Classification Search
None
See application file for complete search history.

(56) References Cited

U.S. PATENT DOCUMENTS

2003/0212597 A1* 11/2003 Ollins .................... G06Q 30/02
705/14.31
2005/0227760 A1* 10/2005 Vlazny ................ G06Q 20/363
463/28

(Continued)

FOREIGN PATENT DOCUMENTS

WO    WO 2005/071579 A2    8/2005
WO    WO 2016/201515 A1    12/2016

OTHER PUBLICATIONS

Apo, "Written Opinion for related PCT Application Serial No. PCT/AU2016/050507, filed on Jun. 16, 2016", Dated Sep. 8, 2016. (5 Pages).

(Continued)

*Primary Examiner* — Paul A D'Agostino
(74) *Attorney, Agent, or Firm* — Mark Malek; Widerman Malek, PL

(57) ABSTRACT

A collaborative betting platform is structured around a server (1) in communication with client devices (4) via the Internet (3), the server (1) configured to facilitate specific electronic betting transactions, and more particularly allowing electronic betting selections registered by primary bettors (110) to be conditionally processed on behalf of secondary bettors (120). Such facilitation of electronic betting selections is contingent upon recording a credit note against an account of a secondary bettor (120), which has the effect of reserving funds in the account of the secondary bettor (120). The amount of the credit note is representative of a minimum stake amount which the secondary bettor (120) is requested to commit to bet by accepting a back bet offer based upon a betting selection registered by a primary bettor (110).

19 Claims, 27 Drawing Sheets

(56) References Cited

U.S. PATENT DOCUMENTS

| | | | |
|---|---|---|---|
| 2009/0098921 A1* | 4/2009 | Manning | G06Q 20/3224 463/17 |
| 2009/0239650 A1* | 9/2009 | Alderucci | G06Q 20/207 463/25 |
| 2010/0041482 A1* | 2/2010 | Kumar | G06Q 30/02 463/42 |
| 2010/0124971 A1* | 5/2010 | Baerlocher | G07F 17/3258 463/20 |
| 2011/0275432 A1* | 11/2011 | Lutnick | G07F 17/3232 463/25 |
| 2013/0023329 A1* | 1/2013 | Saunders | G07F 17/34 463/20 |

OTHER PUBLICATIONS

Apo, "International Search Report for related PCT Application Serial No. PCT/AU2016/050507, filed on Jun. 16, 2016", Dated Sep. 8, 2016. (4 Pages).

\* cited by examiner

Future Bets Queue Data File Structure

Primary Bettor 999

| Pointer | | x | | | |
|---|---|---|---|---|---|
| Seqeunce | Next-1 | Next | Next+1 | Next+2 | Next + 3 |
| Total Future Bet Stake | $150 | $100 | $500 | $500 | $200 |

Secondary Bettor Identifier: 3819

Stake amount: $30

Secondary Bettor Identifier: 9839

Stake amount: $50

Secondary Bettor Identifier: 1109

Stake amount: $20

Back Betting Sequence Diagram

| SELECTION | BETTING ODDS |
|---|---|
| 1. Option A | 9.50 |
| 2. Option B | 3.20 |
| 3. Option C | 3.80 |
| 4. Option D | 201 |
| 5. Option E | 15 |
| 6. Option F | 19 |
| 7. Option G | 26 |

BETTING EVENT SCREEN

BETTING EVENT SCREEN

| SELECTION | BETTING ODDS |
|---|---|
| 1. Option A | 9.50 |
| 2. Option B | 3.20 |
| 3. Option C | 3.80 |
| 4. Option D | 201 |
| 5. Option E | 15 |
| 6. Option F | 19 |
| 7. Option G | 26 |

Primary Bettor Betting Odds (60)

Selection Option C
Original Odds $3.80
Enhanced Odds $4.06
Stake $10
Estimated Return $40.66 (61)

FIG 14

COLLABORATIVE BETTING PLATFORM

CROSS REFERENCE TO RELATED APPLICATIONS

This is a utility patent application which claims the benefit of international application PCT/AU2016/050507, filed on Jun. 16, 2016, which claims benefit to Australian application AU 2015902302, filed on Jun. 16, 2015, the contents of which are hereby incorporated by reference in its entirety.

FIELD OF INVENTION

The present invention relates to the field of betting technologies, and more particularly electronic betting transactions for sports betting, horse racing, harness racing, greyhound racing and other betting events where there is more than one possible outcome from a race, match, program or scenario.

BACKGROUND OF THE INVENTION

Betting agencies publish betting information on their web properties or via third party sites and affiliates to aid betting decisions, and in an attempt to attract prospective customers to a betting agency on the Internet and increase customer acquisitions and betting turnover.

Betting information usually includes selections 'tips' for a betting event from a perceived 'knowledgeable source'. These betting agencies and their agents whose web properties publish this information, receive some benefit from the provision of this information as potential customers have to visit the provider's web property to access the information, and therefore may be compelled to place a bet or provide some other monetised exchange while visiting the web property. The user is in any case able to obtain the betting information without any monetary exchange with the betting agency or website providing the information.

Existing arrangements of the types described above are not entirely satisfactory, and there is accordingly a need to address these and other limitations of the state of the art, or at least provide a useful alternative.

SUMMARY OF INVENTION

The present invention in its various aspects arises from a recognition that a collaborative betting platform can be structured to facilitate specific electronic betting transactions, and more particularly allowing electronic betting selections registered by primary bettors to be conditionally processed on behalf of secondary bettors. Such facilitation of electronic betting selections is contingent upon recording a credit note against an account of a secondary bettor, which has the effect of reserving funds in the account of the secondary bettor. The amount of the credit note is representative of a minimum stake amount which the secondary bettor is requested to commit to bet by accepting a back bet offer based upon a betting selection registered by a primary bettor.

Advantageously, as such electronic betting transactions on behalf of secondary bettors are processed, supplementary remuneration bets are processed on behalf of the primary bettors who have contributed electronic betting selections.

The present invention in one aspect provides a system for enabling collaborative betting comprising a server accessible via an electronic communications network by client devices, the server comprising a processor, controller, database, and a primary bettor interface and a secondary bettor interface, the controller operatively interacting with the primary bettor interface and the secondary bettor interface to execute steps using the processor in conjunction with the database, the server configured to execute the steps of:
  transmitting to the secondary bettor interface back bet offers, the back bet offers indicating only limited data fields regarding primary bets associated with the respective back bet offers;
  receiving from the secondary bettor interface an indication of acceptance of one of the back bet offers transmitted to the secondary bettor interface; and
  in response to acceptance of the back bet offer received from the secondary bettor interface:
  recording a credit note reserving funds against an account of the secondary bettor, the credit note being a predetermined minimum amount associated with the accepted back bet offer; and
  transmitting to the secondary bettor interface further data fields indicating a betting selection of the primary bet with which the accepted back bet offer is associated, the further data fields representative of a betting slip for confirmation by the secondary bettor;
  wherein the credit note reserves funds in the amount of the predetermined minimum amount in the account of the secondary bettor.

The server is preferably configured to execute the further step of receiving confirmation from the secondary bettor interface of a transaction based upon the betting slip transmitted to the secondary bettor interface.

The credit note is preferably structured to be discharged only against an account of the secondary bettor in credit of a transaction confirming the betting slip transmitted following acceptance of the back bet offer for which the credit note was generated.

The limited data fields associated with the back bet offer preferably comprise one or more data fields selected from the group comprising: primary bettor, betting event, primary bettor profit history, and minimum stake amount. The limited data fields associated with the back bet offer omit a data field of betting selection.

The further data fields representative of the betting slip comprise at least a data field of betting selection, and optionally one or more data fields selected from the group comprising: minimum stake amount, betting event, primary bettor, and bet type.

The server is preferably configured to execute the further steps of receiving confirmation from the secondary bettor interface of a transaction based upon the betting slip transmitted to the secondary bettor interface receiving confirmation of the back bet offer, processing the back bet on behalf of the secondary bettor, and settling the processed bet in an account of the secondary bettor.

The server is preferably configured to execute the further steps of processing the back bet transmitted to the secondary bettor interface in the amount of the minimum stake amount in the absence of receiving confirmation of the transmitted betting slip. The server is preferably configured to execute the further step of co-processing with the back bet a separate remuneration bet based upon the back bet.

The server is preferably configured to execute the further step of settling the processed remuneration bet in an account of the primary bettor responsible for the primary bet from which the back bet offer was generated.

The remuneration bet is preferably made in an amount which is a predetermined fraction of the amount of the back bet. An indicative range of such predetermined fraction is 3% to 5%.

The server is preferably configured to execute the further step of generating back bet offers based upon processing respective individual stored primary bets indexed in the database.

The server is preferably configured to execute the further step of generating back bet offers based upon processing an amalgam of primary bets indexed in the database representing a consensus bet from multiple primary bettors. The consensus bet is identified based upon predetermined criteria applied to either or both of the primary bettors and the betting selections made by the primary bettors.

The server is preferably configured to execute the further step of settling the processed bet and related remuneration bet in accounts of the primary bettors contributing to the consensus bet.

The received primary bets stored in the database are indexed to include data fields that include: a primary bettor id, an event id, a primary bettor selection id, and a stake amount.

The present invention in a further aspect provides a system for enabling collaborative betting comprising a server accessible via an electronic communications network by client devices, the server comprising a processor, controller, database, and a primary bettor interface and a secondary bettor interface, the controller operatively interacting with the primary bettor interface and the secondary bettor interface to execute steps using the processor in conjunction with the database, the server configured to execute the steps of:

transmitting to the secondary bettor interface back bet offers, the back bet offers indicating only limited data fields regarding anticipated future primary bets associated with the respective back bet offers;
  receiving from the secondary bettor interface an indication of acceptance of one of the back bet offers transmitted to the secondary bettor interface; and
  in response to acceptance of the back bet offer received from the secondary bettor interface:
  recording a credit note reserving funds against an account of the secondary bettor, the credit note being an amount specified by the secondary bettor equal to or greater than a predetermined minimum amount associated with the accepted back bet offer;
  receiving from the primary bettor interface the anticipated future primary bets; and
  scheduling for processing the future primary bets and accepted back bets based upon the future primary bets.

The server is configured to execute further preferred steps in a manner analogous to the further steps described above in connection with the first-mentioned aspect of the present invention.

The present invention in a related aspect combines elements of the second-mentioned aspect of the invention, and elements of remuneration betting described and depicted in connection with the first- and second-mentioned aspects of the present invention.

A user, as described herein, during use of the system or platform may variously elect to act in the role of primary bettor, in the role of secondary bettor, or both according to the particular details of their registration with the collaborative betting platform, as recorded at the server.

A primary bettor originates primary bets comprising particular betting selections. Back bet offers are presented based upon primary bets. The back bet offer is an electronic advertisement which is structured to permit a secondary bettor at their client device to accept the back bet offer (for example, by touching a display or clicking a part of the client screen) that the user "secondary bettor" must action to indicate their intention to gain access to the selection and bet on it.

Advantageously, embodiments of the present invention are implemented to increase the efficiency of electronic betting transactions by eliminating the need for a traditional two-step process in which the user first obtains the betting information, and then places bets using the selections contained within the information.

A contracted process is instead provided in which the user indicates an action on an Internet property, which represents their intention to bet on the selection or at a minimum commit to bet on a related betting event, prior to revealing the desired betting selection, which can be actioned as the user wishes.

On the other side of the transaction, embodiments of the invention provide a structured mechanism that ensures that the provider of the betting information used in the back bet process is remunerated for the provision of successful betting information via a fraction of the bet which is placed on the provider's behalf. This remuneration mechanism is structured by leaving the original betting stake less the aforementioned fraction placed as a bet for the provider, as the stake for the user who has used the provider's information.

A unique user identification number is used in a client device web session in response to the indicated action. The server uses this unique user identifier to read the user records contained with its server database and identify the user. The user record is checked to ensure that he is registered in the server, is qualified to place bets on the server and that his cash balance representing residual funds remaining from deposits after betting activity and less withdrawals, is equal to or higher than the minimum acceptable back bet amount.

The minimum back bet amount is predetermined, and set to ensure that the betting agency receives sufficient commercial benefit from the back bet and, if there is a primary bettor that is required to be remunerated, ensures that they also can be accommodated to receive an adequate reward from successful betting advice provided through the information.

A check is made of user records to determine if the request for betting information is the first instance of such a request received from the secondary bettor or the user has indicated that they do require ongoing notification that they are about to commit to bet. If so the server may send a message to the client device that displays the terms that indicate the secondary bettor's commitment to bet if they proceed to gain access to the information. This display may also include a web property, which when indicated for action represents acknowledgement of their commitment to back bet for future requests to access primary bettor's betting information and as such, prevent the message appearing again for future back bets.

The server responds to the indicated action to commit to bet, by reserving the minimum bet stake amount within the secondary bettor's account balance on the server. This ensures that bet requests made by the secondary bettor after this point are not able to utilise the minimum stake committed to bet. The server also displays the selection in a betting slip on the client device with an indication of an action to confirm and finalise the bet. The user enters the betting stake, through the secondary bettor interface and indicates action to place the bet.

The server upon receipt of the confirmed back bet betting slip data package, which includes the betting slip details, checks the user records again to determine that all of the following conditions are met: the betting stake amount is equal to or above the minimum bet amount established earlier in the process; the user's unique session identifier is still linked to the customer record; and the user's account balance is equal to or greater than the minimum stake amount for the back bet. The server places the bet if all of these conditions are met.

Specific implementations can allow the secondary bettor to change the betting selection after committing to bet and viewing the primary bettor's selection in the betting slip. Provision of such a mechanism for conditionally modifying the betting selection increases the attractiveness of committing to bet for the secondary bettor as they may change the selection if the original selection is not desirable for them.

Should the secondary bettor fail to approve the betting selection provided by the time the betting event has closed, the server can automatically utilise the reserved funds in the account of the secondary bettors to place a bet for the minimum stake amount or in an alternative embodiment of the invention, this amount can be simply forfeited as a fee for accessing the betting information.

These methods and server that ensure a commitment has been made to bet before revealing the betting information, converts the utility provided each time betting information is revealed to a secondary bettor, to bets placed through the betting agency providing or sponsoring the provision of the technology and to the primary bettors whose information is used.

An embodiment of the present invention involves the server recording each bet placed by the primary bettor including the selection, the stake and related information in an electronic database against the primary bettor's unique identifier in the server. The results from each recorded bet in the server are calculated and summarised into betting statistics using relevant criteria (e.g. profit at specific locations, over various time periods etc.) and stored on the server in electronic database records against the related primary bettor's unique identifier. The server may display the most relevant and appealing betting statistics for each primary bettor on the client device in addition to the primary bettor's title and an indication for the secondary bettor to action.

The structured mechanisms implemented to facilitate electronic betting transactions are advantageous for the various parties involved. A bet-driven remuneration server creates an incentive for primary bettors to share their betting information in effect with secondary bettors by monetary compensation. The server is configured so that primary bettors with a proven track record reflecting their knowledge and expertise can be expected to attract greater remuneration. Secondary bettors can provisionally access such vetted betting selections at no monetary outlay, conditional upon accepting those betting selections.

After a back bet is confirmed by the server it places an initial bet for the secondary bettor using the current odds in the server for the selected odds type for a stake amount that is a fraction less than the amount the secondary bettor has committed to. The fraction of the stake not placed by the server on behalf of the secondary bettor who used the information is placed by the server on behalf of the primary bettor(s) (remuneration bet) who are deemed to be beneficiaries of the betting information by the server. The slightly lower return that the secondary better receives as a result of the remuneration bet, can be displayed on the secondary bettor interface on the client device as the full stake including the fraction placed for the primary bettor, but at reduced odds down from the original odds received for the bet. This display equates to the same expected return on the bet slip as the reduced stake (less the fraction of the bet placed for the primary bettor) at the original odds received for the bet.

There may be multiple beneficiaries from a back bet as the advertised back bet may represent a consensus view of multiple primary bettors, or the secondary bettor, after viewing the primary bettor's betting information in the betting slip, may change the selection before finalising the back bet. In these instances the server places the remuneration bet for a generic account in the server and determines the primary bettors who will be beneficiaries if the bet wins and their respective shares of the winnings based on factors including amount staked, time before the event that their bet was placed, primary bettor's status in the server, profit performance and other factors.

The primary bettor's bet details are displayed on the primary bettor interface on the client device showing their enhanced odds, which represents the total return from their share of the remuneration bet placed on their behalf using the fraction of the secondary bettor's stake plus the return from their own stake. Each back bet placed by a secondary bettor where a particular primary bettor receives some or all of the return from the fraction of the bet placed as the remuneration bet, further enhances the primary bettor's odds as displayed on the primary bettor interface on the client device.

Embodiments of the invention allow secondary bettors to commit funds towards primary bettor's bets that they will place through the server in the future. In these instances the secondary bettor may enter an investment amount on the secondary bettor interface appearing on the client device in addition to other data fields that determine how many back bets they wish place into the future and the size of the stake they wish to place using those funds. The server receives the request and first checks the unique user identifier in the web session variables sent to the server from the client device. The server checks the record relating to the unique user identifier. If the user is a valid user who has qualified to bet on the server, has sufficient funds in their account to fulfil the investment commitment and if the individual future back bet amounts which make-up the overall investment commitment are greater than the minimum bet amount set by the server, the future bet details are stored within a specific future bet queue data file on the server. Details for each future bet made by a secondary bettor is indexed in the future bet queue data file using the primary bettor's unique server identifier and the position in the future bet sequence. Stored details include an amount that represents the total of all bet stakes placed as future bets for that number in the future sequence of bets, the secondary bettor's unique identifier who placed the future bet and the future bet stake amount(s) for each future bet.

When the primary bettor for whom the future back bets were placed, places a bet, the queue for the primary bettor's future bets retained on the server database is checked to obtain the accumulated bet total from all secondary bettors who have invested in the primary bettor's next bet which the 'next bet' file pointer is set to in the future back bet queue for the primary bettor on the server. If the total of all stakes placed as future bets for the next bet in the future bet queue for the primary bettor is greater than zero, a fraction of the future back bet total amount is placed on behalf of the primary bettor by the bet controller in conjunction with the primary bettor's own bet. The client device's primary bettor interface can display the remuneration that the primary bettor will receive from the fraction of this future back bet amount if the bet wins combined with their own bet, as enhanced odds on the primary bettor interface displayed on the client device. Any additional back bets that the primary bettor receives on this bet before the betting event closes, will further enhance these odds, and the odds displaying on the primary bettor interface will be updated accordingly.

The bet controller on the server places a bet for a generic account for the future back bet total less the fraction placed for the primary bettor as a remuneration bet. Winnings from this bet are distributed to secondary bettor beneficiaries during the bet settlement process.

BRIEF DESCRIPTION OF THE DRAWINGS

FIG. 5A is a process flowchart of steps involved depicting back betting activity of respective components of the server of FIG. 1, while

FIGS. 9 to 18 are collectively a series of schematic representations of a client interface of the server of FIG. 1 relating to the activities outlined in FIG. 5A.

DETAILED DESCRIPTION OF PREFERRED EMBODIMENTS

Server Overview

Figure 1:
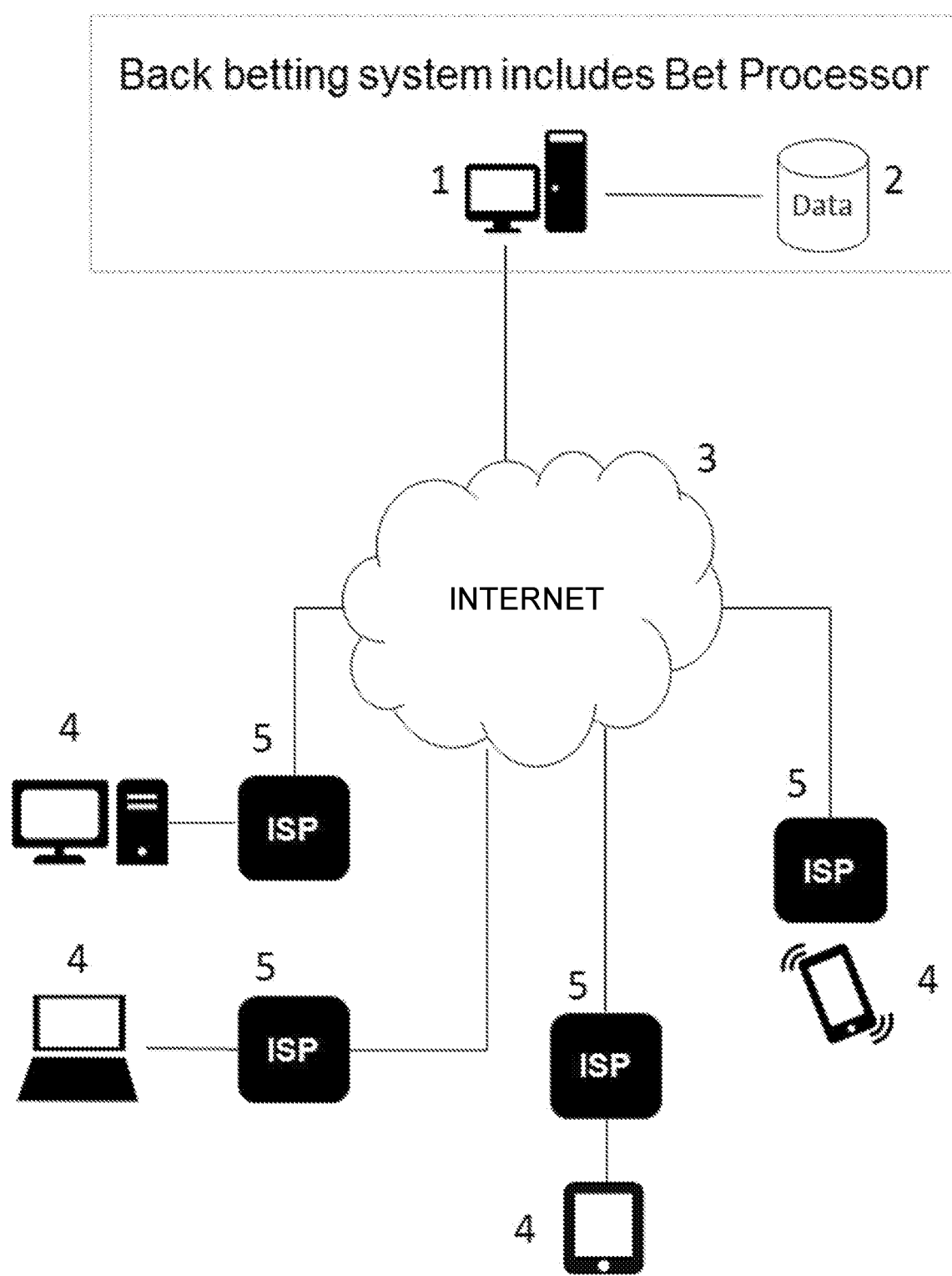
FIG. 1 is a schematic diagram of hardware components of a server according to a preferred embodiment of the present invention.

FIG. 1 depicts hardware components—that is, at the physical level—of a server 1 as described herein. The server 1, contains the bet processor, which records and settle bets. As an example, the server 1 may be a server machine running a Microsoft Windows™ operating server, connected to a back office database 2, for example an Oracle™ or SQL relational database server.

Figure 2:
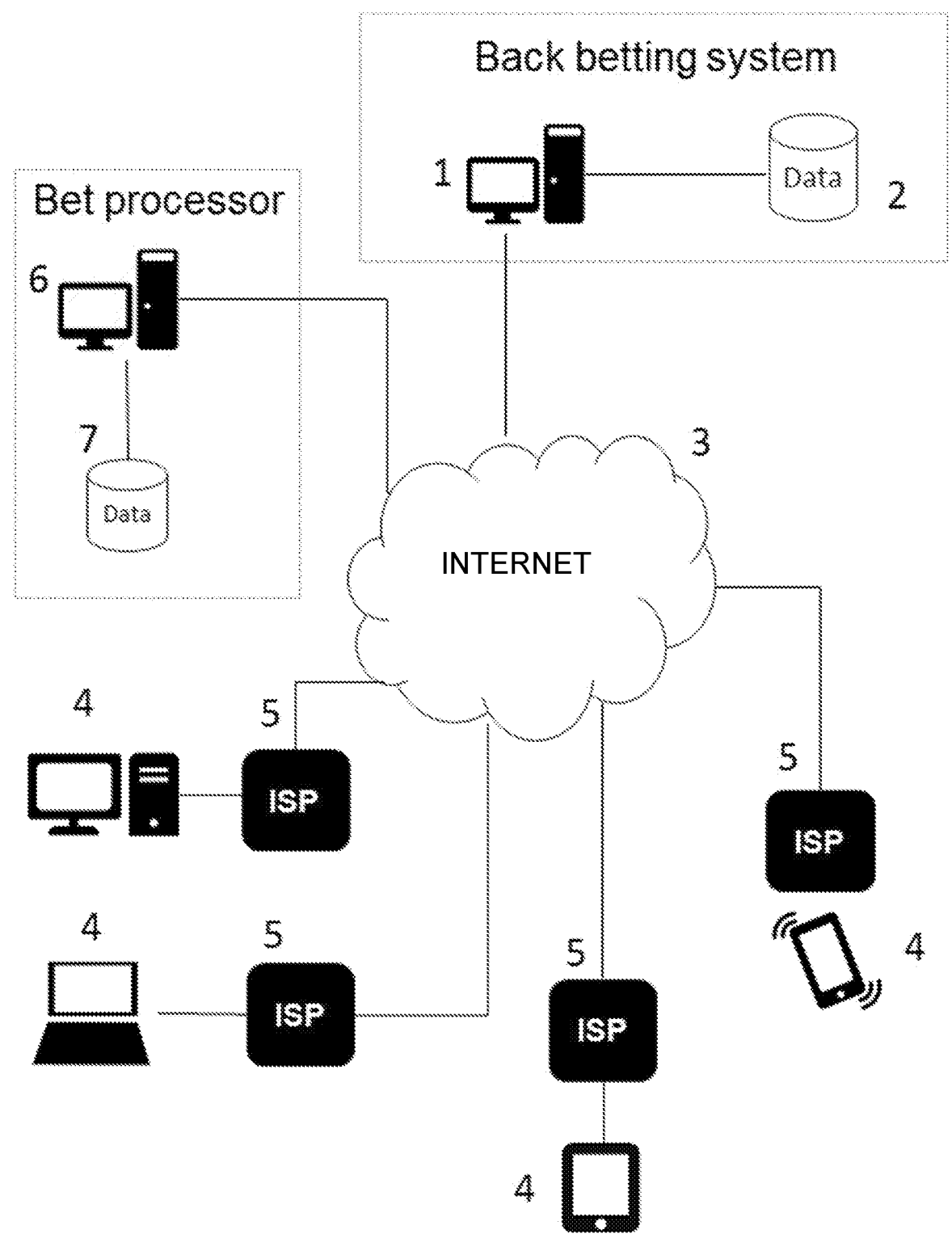
FIG. 2 is a schematic diagram of an alternative architecture of the server depicted in FIG. 1.

An alternate configuration is shown in FIG. 2, in which the server 1 sends bet requests and receives acknowledgement and settlement information from the bet processor which resides on an external server 6 with its own database 7. As an example, database 7 may be hosted by an external betting agency, and is accessed by the server 1 over a secure Internet connection. The database server 2 includes database storage for a comprehensive bettor profit statistics service to be provided in conjunction with a betting service. The server 1 is connected to the Internet 3. The server is accessed over the Internet 3 by a plurality of client devices 4, for example personal computers, mobile phones, tablets or other wearable mobile devices running web browser software such as Microsoft Internet Explorer™, Google Chrome™, Apple Safari™ and using fixed or mobile broadband, wireless hotspots, fixed wireless hotspots, satellite or dial-up connections through respective Internet Service Providers 5.

Access to the server 1 is restricted by, for example, a firewall and other known network security measures. The server 1 includes a web server, for example the Microsoft IIS™ web server, to serve web page requests. The back betting server is Internet software and betting is permitted through betting event screens for betting events displayed on a web page.

Server Model

Figure 3A:
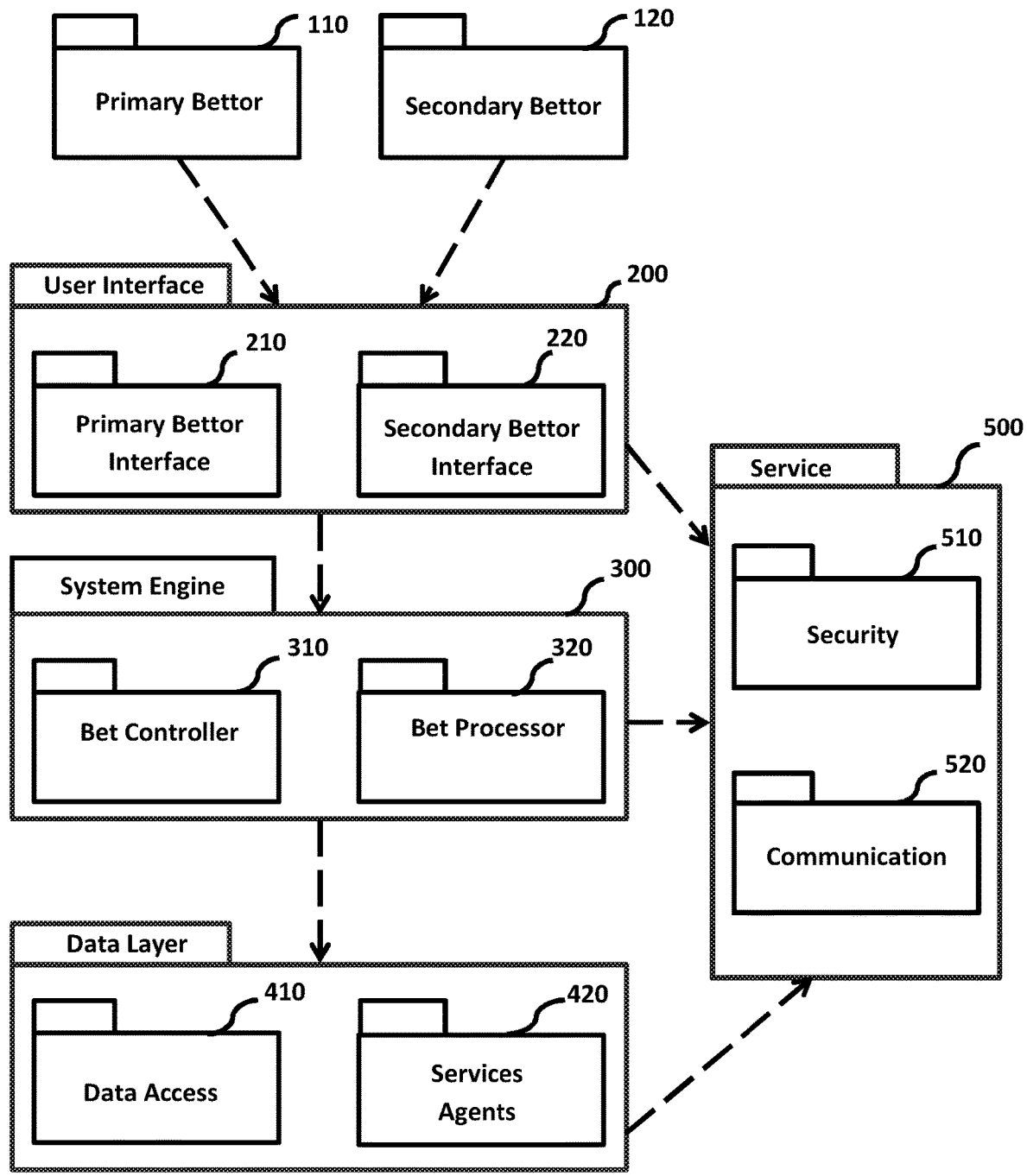
FIG. 3A is a package diagram depicting dependencies between packages of the server model at the logical level.

A server model of the server 1 is illustrated in connection with the package diagram of FIG. 3A, which presents components at the logical level. A primary bettor package 110 and a secondary bettor package 120 respectively use a user interface package 200, which comprises both a primary bettor interface package 210 and a secondary interface package 220 which are both displayed on the client device 4.

The user interface package 200 depends upon the server engine package 300, which comprises both a bet controller package 310 and a bet processor package 320. The server engine package 300 depends on a data layer package 400, comprising a data access package 410 and a services agents package 420.

As depicted, each of the three primary packages (namely, the user interface package 200, server engine package 300 and data layer package 400) depends upon a service package 500. The service package 500 has a security package 510 and a communications package 520. As will become apparent from the description which follows, the server engine package 300 encodes the business logic which is described in further detail below.

These terms are contracted herein for economy and convenience by omitting reference to 'package'.

Physical Hardware—Server and Client Devices

As is now described for completeness, embodiments described and depicted herein rely upon various computing platforms used to implement the client-server architecture described particularly in connection with FIGS. 1 and 2, arranged to interoperate via the Internet 3. Implementation is dependent upon development and deployment of interoperating computer programs able to be executed within respective selected computing platforms and their accompanying operating systems.

Figure 3B:
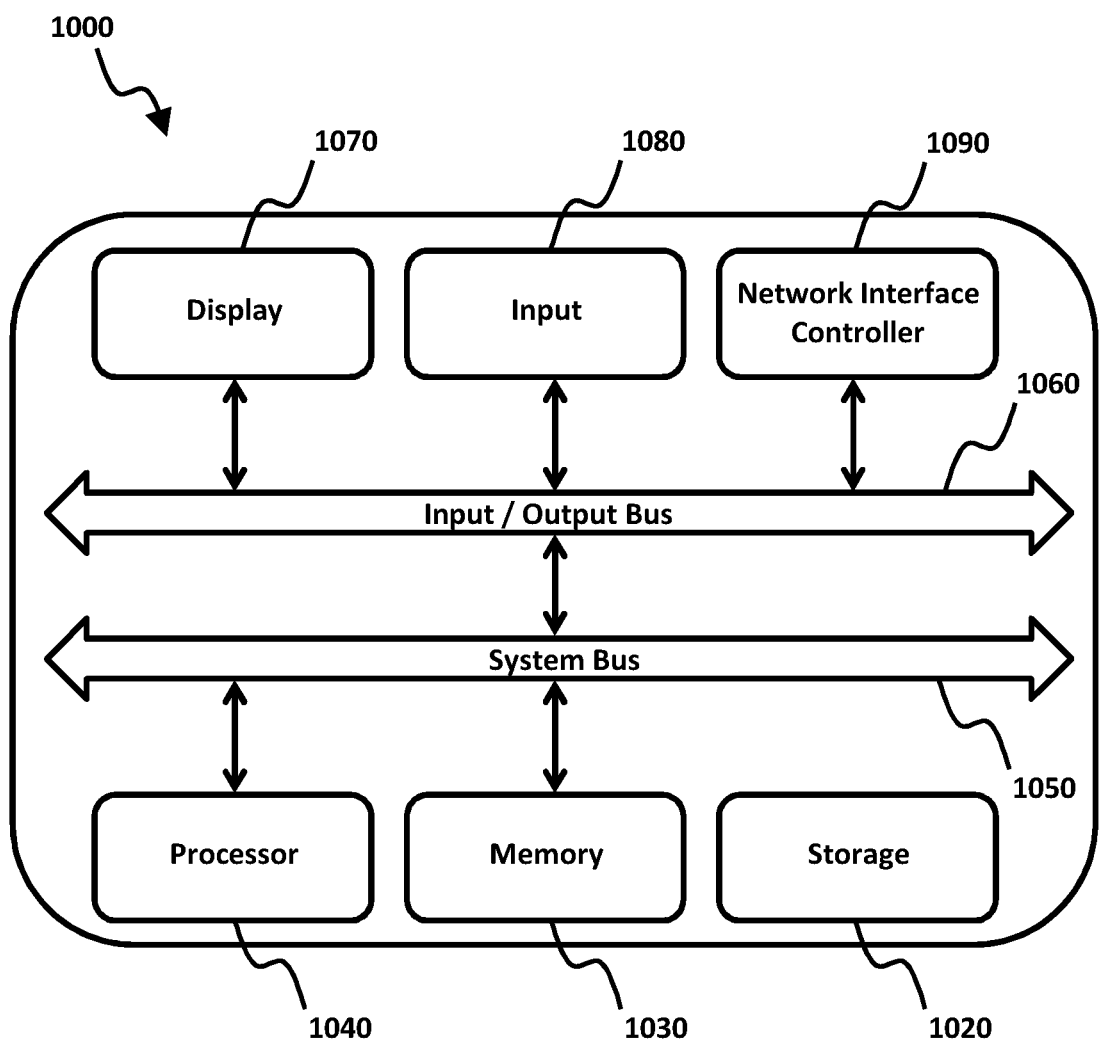
FIG. 3B is a schematic diagram of a generic hardware architecture—at the physical level—that can be generally used to implement hardware components of FIGS. 1 and 2.

FIG. 3B depicts an architecture of a computer system 1000 in schematic form, representative of a generic computing platform suitable for implementing the described platform. This architecture abstracts the physical-layer hardware details, which are differently implemented across manifestations of the server 1 and client devices 4.

The computer system 1000 comprises in its principal components a storage 1020, a memory 1030 and a processor 1040, each of which is interconnected via a system bus 1050. The system bus 1050 is linked to an input/output bus 1060, which interfaces with a display 1070, input 1080, and a network interface controller 1090. The network interface controller 1090 is configured to permit intercommunications with a network external of the computer system 1000.

The storage 1020 provides a non-volatile data storage medium for storing application data and executable code, and is typically flash memory, or other data storage device such as a magnetic hard disk drive. The memory 1030 is a random-access memory used to load executable code and application data from storage 1020.

The processor 1040 executes instructions of a computer program loaded from memory 1030 by performing the basic arithmetic, logical, control and input/output (I/O) operations specified by the instructions. The processor 1040 comprises at least a central processing unit, and may be supported by ancillary processing units for performing specialist functions—such as dedicated graphics processing.

The display 1070 provides a visual window to a user, who can interact via input 1080. The input 1080 in the example of a personal computer or workstation comprises a keyboard and mouse. Alternatively, in the case of a tablet or smartphone the input 1080 comprises a touchscreen layered over the display 1070, and responsive to input gestures.

The network interface controller 1090 provides a port for the computer system 1000 to communicate by transmitting data to and receiving data from a network (not shown, though will be the Internet 3), and implements electronic circuitry required to communicate using a specific physical layer and data link layer standard.

The network interface controller 1090 is configured to interoperate using wired standards such as Ethernet or Token Ring, or wireless standards such as provided by the IEEE 802.11 wi-fi standard, or ITU-R 4G cellular standard. This provides a base for a full network protocol stack, which permits large-scale network communications through routable protocols, such as Internet Protocol (IP) over the Internet 3. Connection to the Internet is typically mediated via a firewall server or proxy server.

The client-software architecture implements a particular software design and architecture, distributed amongst both server 1 and client devices 4. Processing is conducted co-operatively as required though principally at the server 1, with some minimal processing executed at the client devices 4, and local data caching and synchronisation with the server 1.

An application at the client device 4 comprises, a presentation layer, or user interface, an application layer, and a data layer is implemented by computer programs installed and executing are deployed.

Software implemented at the server 1 comprises one or more server programs executing by the server 1 within the server operating system. These server programs implement domain logic, which encodes how data can be created, displayed, stored, and changed, as contrasts with the remainder of the software comprising application logic which is primarily concerned with lower-level details of managing a database or displaying the user interface, system infrastructure, or generally connecting various parts of the program.

Software implemented at the client devices 4 vary according to computing platforms, but may be implemented as stand-alone apps (for smartphone or tablets, which tend to rely upon a touchscreen for input) under mobile operating systems or stand-alone applications (for laptops or personal computers) under desktop operating systems. Regardless of the computing platform, dedicated web browsers can be used to implement a web application via scripting executed by the web browser, under both mobile or desktop operating systems.

Selection of suitable channels for delivery of client software, and favoured environments and frameworks for development is informed by technical requirements and developer skill set. Regardless, client software is designed to present a user interface and application logic, as described in further detail below.

User Registration and Access

Figure 4:
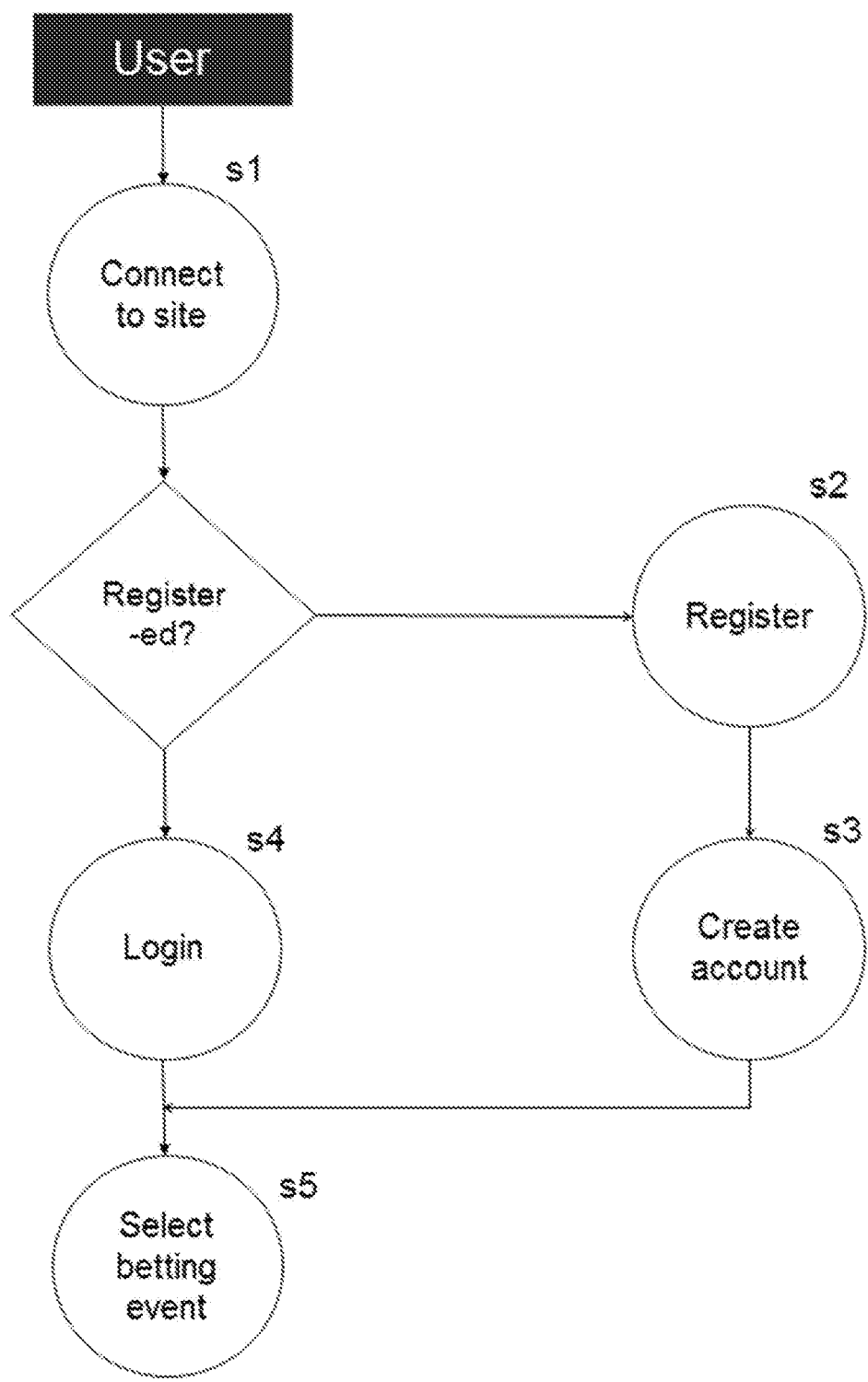
FIG. 4 is a process flowchart of steps involved in preliminary registration and access for users of the server of FIG. 1 and FIG. 2.

FIG. 4 depicts via a process flowchart the operation of the server 1 described above, as regards to preliminary registration requirements. This process will be broadly familiar in some aspects, and is described for completeness.

The user connects to a site hosted by the server 1 via the Internet 3 (FIG. 4, step s1) described in connection with FIG. 1. If the user is already registered then they will proceed to a login screen (FIG. 4, step s4) at which they will enter their account username and password, and if authenticated, the user can proceed to select a betting event (FIG. 4, step s5).

If the user is not already registered, he is required to register (FIG. 4, step s2) where he provides personal details so as to uniquely identify himself. Details can include typical credentials such as first name, surname, address, phone number, date of birth and email address. When registering, users also provide a unique identification code or alias and password, which is used to login in the future. Registered users have full access to all account facilities provided by the system.

Background verification can be performed as required (e.g. date of birth, address details), and at a minimum user eligibility is performed as regards to age, and address for betting jurisdiction requirements.

A user account is created (FIG. 4 step s3) as part of registering the user, should these details supplied be deemed satisfactory, and a unique server identifier accorded the user. Following account creation, the user is effectively logged in, and proceeds to selecting a betting event (FIG. 4, step s5).

Registering Consent for Sharing Betting Selection Information

As part of the registration process, in the implementation described, registered users can indicate whether or not they consent to share their betting information, be it actual betting selections or virtual betting selections.

Consenting to share betting information has the implication that the user can use the server in the role of both primary bettor 110 or secondary bettor 120.

Users can only use the server 1 as a secondary bettor 120 if they fail to provide consent for their betting information to be shared or advertised—that is, with a view to allowing users (acting as secondary bettors 120) to access that information through the server 1.

A facility is preferably provided for users to extend at their discretion their capability to be a primary bettor 110 on the server 1 by changing their account settings and consent settings to share their betting information. Likewise, a primary bettor 110 may decide to withdraw their consent to share their betting information at any time by updating their account settings so that they do not share their betting information.

The consent to share bets is stored in the user's database record indexed by a unique server identifier stored in Internet session details, which is referenced each time bets are placed by the server 1 to determine if bets should be advertised alongside with betting history statistics on related betting event screens, as described in further detail below. Only registered users, who have qualified to bet and who also have funds in their accounts can place bets through the server 1.

Primary bettors 110 can enter their betting information through the server 1 in the form of virtual bets. Such virtual bets are as the term implies processed similarly as bets except that actual funds are not transacted. The server 1 otherwise records the betting results for each primary bettor 110, and calculates their betting statistics against various criteria e.g. time period, event venue/racecourse as would be the case if the virtual bets were actually processed and settled using actual funds via the bet processor 320.

Betting profit statistics connected with bets made by primary bettors 110 are used as the basis of back bet offers, which are presented to secondary bettors 120, as described below in further detail.

Back Betting Server—Functional Overview

Figure 5A:
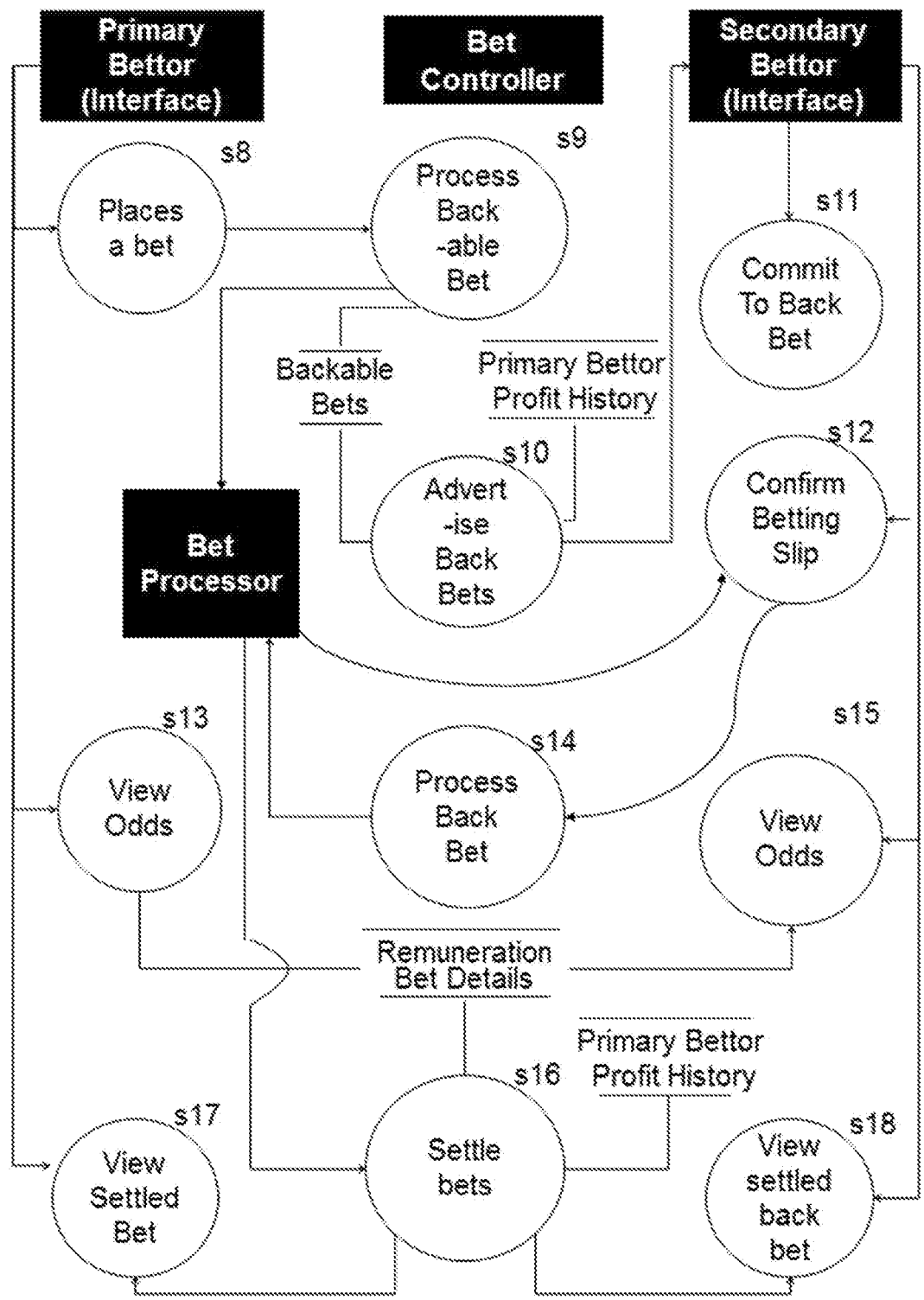

FIG. 5A is a flowchart depicting functional steps in broad overview principally transacted at or connected with the server 1, while FIG. 5B to FIG. 5F offer exploded detail of selected steps into sub-steps, as will become more apparent from the following description and accompanying pseudocode fragments.

Returning to FIG. 5A, a primary bettor 110 places a bet in step s8 via the primary bettor interface 210. The server 1 uses the user's unique identifier in their web session details and checks the user record of the primary bettor 110 to confirm that they have elected to share their bets as a registered user and if so processes their (backable) bet in step s9.

As indicated, records relating to backable bets and related profit history of the primary bettor 110 are updated accordingly following step s9, and the backable bets are advertised (in effect) instantaneously by the server 1 onto the client devices 4 via the secondary bettor interface 220 in step s10.

The back bet offer delivered through the secondary bettor interface 220 permits a secondary bettor 120 to respond back to the bet controller 310 at the server 1 by committing to the back bet that the secondary bettor 120 acts upon through the secondary bettor interface 220. Accepting the back bet offer permits the secondary bettor 120 access to the betting selection and other related information connected with the primary bet underpinning the back bet offer, such as stake amount and any accompanying commentary.

Typically, acceptance of a back bet offer by a secondary bettor 120 will be by a simple click or tap from the secondary bettor 120 at their client device 4, which is delivered through the secondary bettor interface 220.

At this point, a secondary bettor 120 having viewed the back bet offer on their client device 4—in step s10—elects to commit to place a back bet in step s11 using the betting information of the selected primary bettor 110.

Having committed to bet in step s11, the secondary bettor 120 confirms the betting slip presented to the secondary bettor 120 in step s12. The back bet is processed via the bet controller 310. Both the bet of the secondary bettor 120 and the related remuneration bet for the primary bettor 110 are transmitted to the bet processor 320 for processing (step s14).

The results of the processed bets are transmitted back from the bet processor 320 to the bet controller 310, and settled in step s16 with the proceeds of processed bets into respective accounts of a secondary bettor 120 and primary bettor 110. The results of settlement can be viewed by a primary bettor 110 in step s17 and a secondary bettor 120 in step s18. Primary bettors 110 can view enhanced odds received from back bets in step s13 and secondary bettors 120 view their reduced odds from back bets in step s15.

As foreshadowed, FIGS. 5B to 5F explode selected steps—outlined in overview in FIG. 5A—into particular sub-steps, as described in further detail below. The preferred technical implementation of steps s10 (FIG. 5B), s11 (FIG. 5C), s12 (FIGS. 5D & 5E) and s14 (FIG. 5F) are also described in terms of relevant pseudocode fragments in the TABLES 1 to 12 below.

As described below in further detail, the server 1 validates an account of a secondary bettor 120 to ensure that the account of the secondary bettor 120 contains sufficient funds. The amount of funds in the account of the secondary bettor 120 should be at least equal to the predetermined minimum stake amount that forms the back bet offer. Should this validation be met, the server 1 reserves the predetermined minimum stake amount against the account of the secondary bettor 120 by way of a credit note recorded against the account, prior to revealing the betting selection in a betting slip transmitted via the secondary bettor interface 220 and ultimately displayed on the client device 4 used by the secondary bettor 120.

The server 1 creates a credit note for the predetermined amount equating to the minimum bet stake of the underlying primary bet, and records that credit note against an account of the secondary bettor 120. The credit note amount is thus recorded against the balance of the account for the secondary bettor 120 in the database server 2. The credit note serves to restrict use of these reserved funds in a predefined manner in accordance with conditions predetermined for the credit note. The server 1 can restrict use of funds covered by the credit note to be used only with the back bet betting slip containing the betting information from the primary bettor 110 in question. More exotic options are also possible.

The betting slip contains a stake amount entry field, and a bet type selection field. Optionally, the secondary bettor 120 can be presented with an option to change the selection of the primary bettor 110 to another outcome in same betting event, for example. The betting slip also provides the secondary bettor 120 with a facility to confirm the details presented and entered, which permits the bet to be passed for processing.

When a secondary bettor 120 is presented with a back bet betting slip, a number of discrete outcomes are possible. The secondary bettor 120:

enters a stake that is greater or equal to the minimum bet amount and confirms the bet slip;

selects another outcome in the betting event and enters a stake greater or equal to the minimum bet mount and confirms the bet slip;

enters a stake less than the minimum bet amount and/or enters a stake amount that exceeds the funds available in their account considering the credit note with reserved funds; or performs no action.

If the secondary bettor 120 enters a stake that is greater or equal to the minimum bet amount, and funds in the required amount are available, and the secondary bettor 120 confirms the betting slip, the betting slip details are processed by the bet controller 310, calculating the details of the remuneration bet and the secondary bettor's bet and passing those details to the bet processor 320 to process the back bet. This means that the stake amount entered is greater or equal to the minimum amount reserved as a credit note, and the entered amount is less than the amount of funds available in the account of the secondary bettor 120 taking into consideration the credit note reserved for the back bet offer.

The bet controller 310 in this instance obtains the funds for the bet amount by:

checking the account of the secondary bettor 120 for recordal of a credit note having an identifier which is matched to the betting slip identifier for the back bet offer;

subtracting the amount on the matched credit note from the funds required to process the bet;

changing the value on the recordal of the credit note from the account of the secondary bettor 120 to zero; and deducting from the account balance of the account of the secondary bettor any further funds required still to make up the amount of the stake entered in the betting slip in total.

If the secondary bettor 120 enters a stake less than the minimum bet amount and/or enters a stake amount that exceeds the funds available in their account, the server 1 generates a message indicating that the stake amount is incorrect and an explanatory comment is transmitted to the secondary bettor interface 220 if the secondary bettor 120 enters a stake less than the minimum bet amount or enters a stake amount that exceeds the funds available in the account of the secondary bettor 120, when taking into account a matching credit note. The betting slip can be displayed to allow the secondary bettor 120 to re-enter an appropriate amount.

When the server 1 registers no action received from the secondary bettor 120 in response to delivering the betting slip, the bet controller 310 preferably executes further processing when receiving from the bet processor 320 a notification that the betting event is closed for betting. At this time, no further bets other than unprocessed back bets can be processed by the bet processor 320 for the betting event in question.

The bet controller 310 checks for all outstanding back bet betting slips registered in the server 1 relating to the closed betting event, and updates the betting slip details such that the selection equals the selection of the primary bettor 110, the stake amount equals the credit amount matched to the betting slip identifier representing the minimum stake amount reserved for use in the betting event, and uses the current betting odds in the server for the betting selection.

The back bet offer is confirmed for the secondary bettor 120 via the secondary bettor interface 220 and is then processed in step s14 using the back bet betting slip data package. The bet controller 310 on the server 1 divides the bet up into two bets, one processed for the benefit of the secondary bettor 120 at the original staked amount, less a small percentage of the stake. The small percentage of the staked amount is then placed as a remuneration bet, which is processed for the benefit of the primary bettor(s) 110, using the back bet betting slip data. Implementational details concerning remuneration bets are described in further detail below.

Should a secondary bettor 120 decide to change the betting selection presented, from the primary bettor 120, as displayed in the bet slip, and choose another outcome in the same betting event, a remuneration bet is placed using a fraction of the secondary bettor's stake for a generic account. Winnings from this account can be distributed in the Settle Bets process (s16).

After a back bet is placed, the potential benefit of the remuneration bet to the primary bettor(s) 110 whose information was used in the back bet can be viewed by the primary bettor(s) 110 as enhanced odds in step s13. Conversely, the odds processed for the secondary bettor 120 may be reduced to reflect the amount of the bet placed from his back bet for the primary bettor(s) 110, and can be viewed in step s15.

Advertising Back Bets

Figure 5B:
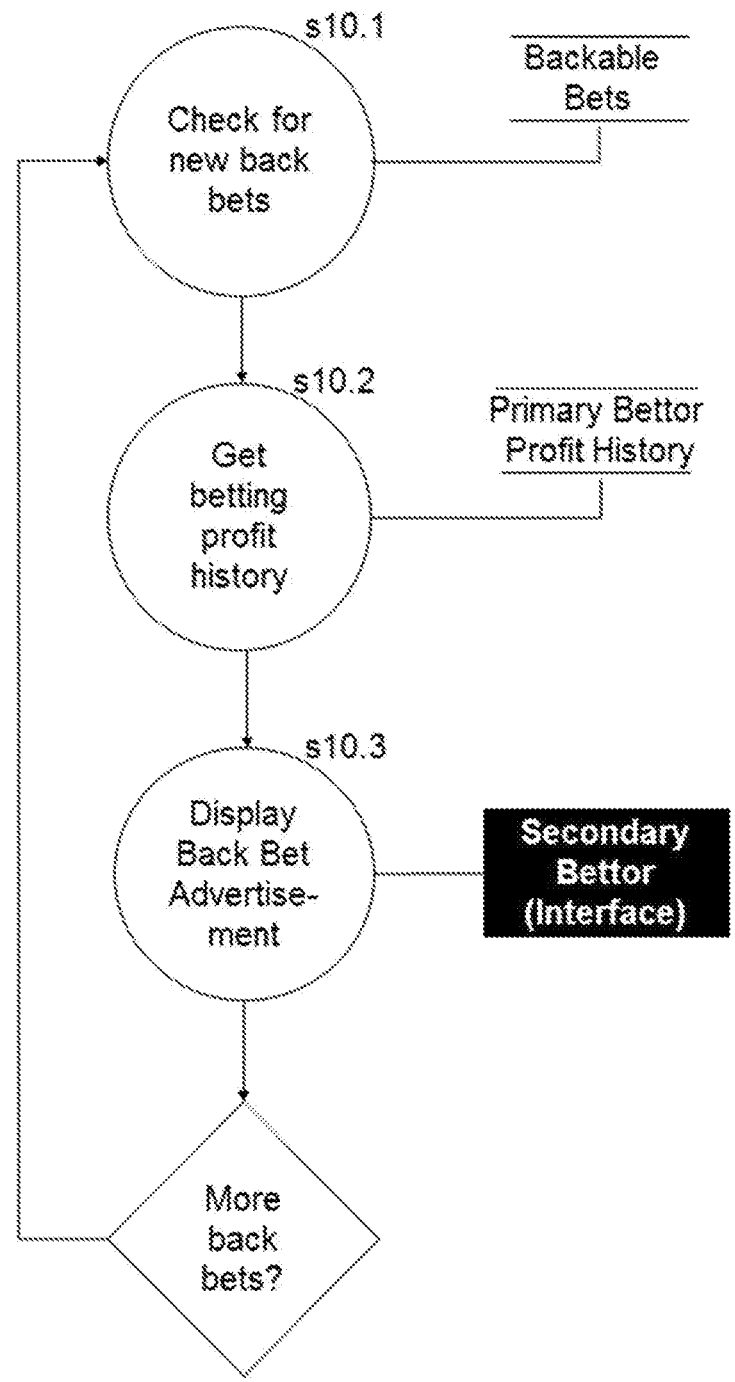
FIGS. 5B to 5F are further process flowcharts that detail steps of FIG. 5A.

FIG. 5B is a flowchart of steps involved in advertising back bet offers, and pseudocode fragments detailed in TABLES 1 to 3 deal with processing invoked for advertising back bets (steps 10.1 to 10.3).

Advertising back bets (as described with reference to step s10 of FIG. 5A) involves checking for new back bets in step 10.1, with reference to stored information in the database server 2. A betting profit history is then retrieved in step 10.2, and a back bet offer constructed and transmitted through the secondary bettor interface 220 for display in step 10.3. These steps cycle through as indicated as backable bets are indexed to be made available as back bet offers.

TABLE 1 below provides a pseudocode fragment relevant to step s10.1, namely checking for new backable bets.

TABLE 1

(\*\*\* Obtain the betting event of the user's current web page to obtain relevant advertisements. Alternatively the server may fetch all primary bettors who have open bets in the server and list advertisements by primary_bettor \*\*\*)
Read the betting_event from WEB_SESSION variables
Initialise counter
Do While still on the betting_event web page
(\*\*\* alternatively while the user remains on the web page listing primary bettor advertisements\*\*\*)
    If counter reaches 200 seconds (\*\*\* check for new bets added to the server for advertising relevant to the current page\*\*\*)
        Initialise counter
        Read BACKABLE_BET table for new records
        For each new record
            Save to WEB_SESSION;
    (\*\*\* save relevant variables to be accessed in the user's current web session \*\*\*)
            BACKABLE_BET.primary_bettor_id,
            BACKABLE_BET.event_id,
            BACKABLE_BET.primary_bettor_selection_id,
            BACKABLE_BET.stake_amount,
            BACKABLE_BET.bet_comment.
            Call Get_Betting_Profit_History (primary_bettor_id, event_id)
            Call Display_Back_Bet_Advertisement( )
        EndFor
    EndIf
EndWhile TABLE 2 below provides a pseudocode fragment relevant to step s10.2, namely generating betting profit history.

TABLE 2

Read PRIMARY_BETTOR_PROFIT_HISTORY selecting highest profit betting statistics for profit categories relating to primary_bettor_id and event_id
Write to WEB_SESSION;
    PRIMARY_BETTOR_PROFIT_HISTORY.statistic_category,
    PRIMARY_BETTOR_PROFIT_HISTORY.statistic_amount.

TABLE 3 below provides a pseudocode fragment relevant to step s10.3, namely displaying back bet offers, also termed back bet advertisements.

TABLE 3

Figure 5C:
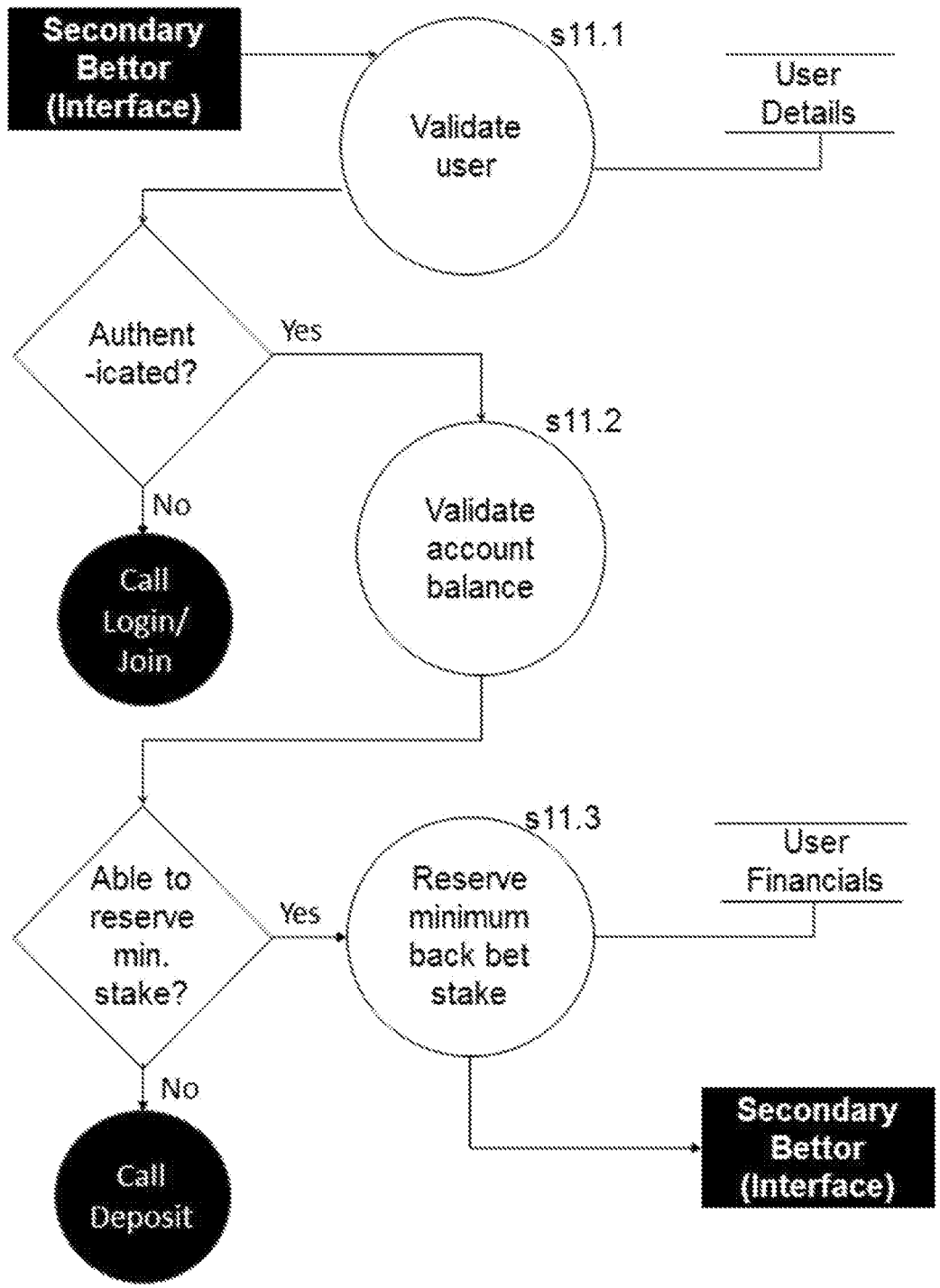

Read WEB_SESSION variables
DISPLAY Back_Bet_Advertisement web_form including
    primary_bettor_id,
    statistic_category,
    statistic_amount
with input fields
    ACTION_BUTTON Committing to Back Bet FIG. 5C is a flowchart of processing steps invoked in committing to back bet, by accepting a back bet offer, and TABLES 4 to 6 below provide relevant pseudocode fragments relevant to steps s11.1 through to 11.3 relating to these steps.

Committing to back bet (as described with reference to step s11 of FIG. 5A) involves first validating a secondary bettor 120 in step s11.1, based upon user details. Validation involves checking that the secondary bettor 120 is logged in, subject to successful authentication, and their account balance is validated in step s11.2.

A determination is made as to whether or not the applicable minimum stake is able to be reserved in the account of the secondary bettor, and if so a minimum back bet stake is reserved in step s11.3.

TABLE 4 below provides a pseudocode fragment relevant to step s11.1, namely validating a user.

TABLE 4

```
(*** web form has been submitted by the user actioning the button on the
advertisement ***)
Submit_Web_Form received from Back_Bet_Advertisement
Read WEB_SESSION variables
Read USER_DETAILS table using secondary_bettor_identifier
If secondary_ bettor_identifier does not exist
    Call Login/Join( ) (*** user not logged in - validate the user in the server ***)
Else
    If USER_DETAILS.show_back_betting_summary_terms is 'YES'
        (*** user wants to see warning about commitment to bet ***)
        Display terms explaining minimum bet requirements with
        READ_TERMS_BUTTON, show_me_again.
        Submit_Web_Form received from READ_TERMS_BUTTON with
        show_me_again
        If show_me_again is set to NO
        (*** user has indicated that they no longer need to see the warning
        ***)
            Set USER_DETAILS.show_back_betting_summary_terms is
            'NO'
            Update USER_DETAILS table using
            secondary_bettor_identifier
        EndIf
    Save to WEB_SESSION;
        USER_DETAILS.minimum_bet_amount;
    Call Validate_Account_Balance(secondary_bettor_identifier)
EndIf
```

TABLE 5 below provides a pseudocode fragment relevant to step s11.2, namely validating a user's account balance.

TABLE 5

```
(*** need to freeze access to funds while we action the requested commitment to
bet ***)
Read and Lock USER_FINANCIALS table record using secondary_bettor_identifier
Save to WEB_SESSION;
    USER_FINANCIALS.transaction[last_transaction].balance
If balance is greater than or equal to minimum_bet_amount
(***the user's balance is greater than the minimum amount required to bet and so
the selection can be revealed ***)
    Call Reserve_Minimum_Stake(secondary_bettor_identifier, event_id) (***
    first we need to reserve the minimum bet amount in the user's account ***)
    Call Display_Back_Bet_Betting_Slip(secondary_bettor_identifier, event_id)
    (*** now we can reveal the selection in the betting slip ***)
Else
(*** the user doesn't have sufficient funds to enable them to commit to bet in the
betting event; therefore we can't reveal the selection. ***)
    Unlock USER_FINANCIALS table record using secondary_ bettor_identifier
    Display Insufficient Funds message
    Call Deposit_Funds( )
    EndIf
```

TABLE 6 below provides a pseudocode fragment relevant to step s11.3, namely reserving the minimum back bet stake.

TABLE 6

```
(*** create the betting slip record so that we can reserve the minimum betting
amount exclusively for its use ***)
Set next_bettingslip_id to be the next unused sequential betting slip identifier
Set BETTING_SLIP.status to "Open"
Set BETTING_SLIP.bettingslip_id to next_bettingslip_id
Set BETTING_SLIP.event_id to event_id
Set BETTING_SLIP.bettor_identifier to secondary_bettor_identifier
```

TABLE 6-continued

Set BETTING_SLIP.selection_id to primary_bettor_selection_id
Set BETTING_SLIP.minimum_bet_amount to minimum_bet_amount
Set BETTING_SLIP.primary_bettor_selection_id to primary_bettor_selection_id
(*** save primary bettor selection in case the bet controller needs to complete the
un-actioned betting slip ***)
Set BETTING_SLIP primary_bettor_identifier to primary_bettor_id
(*** need to store who the primary bettor was in case the betting slip isn't actioned,
in which case the server will execute the betting slip using the primary bettor's
selection***)
Set BETTING_SLIP.back_bet to "YES"
Create BETTING_SLIP using bettingslip_id
(*** got the new betting slip identifier, now we reserve the funds and link those
funds to the betting slip ***)
Increment last_tranasction
Decrement balance by minimum_bet_amount
Set USER_FINANCIALS.transaction[last_transaction].balance to balance
Set USER_FINANCIALS.transaction[last_transaction].tran_type to "CREDIT_NOTE"
Set USER_FINANCIALS.transaction[last_transaction].tran_amount to
minimum_bet_amount
Set USER_FINANCIALS.transaction[last_transaction].betting_slip_id to
next_bettingslip_id (* links credit note to be used only for this betting slip *)
Create USER_FINANCIALS.transaction[last_transaction] using
secondary_bettor_identifier (*** write the credit note reserving the minimum bet
amount to the user's financial table ***)
Unlock USER_FINANCIALS.transaction[last_transaction] using
secondary_bettor_identifier
Save to WEB_SESSION;
    next_bettingslip_id
Read and Lock BETTING_SLIP table using next_bettingslip_id
(*** Now, display the betting slip revealing the primary bettor's selection and other
relevant betting information on the secondary bettor interface ***)
DISPLAY betting_slip_form web_form including
    primary_bettor_id,
    event_id,
    primary_bettor_selection_id,
    stake size indicator using stake_amount,
    bet_comment.
with input fields
    secondary_bettor_stake_amount,
    secondary_bettor_selection,
    secondary_bettor_bet_type,
    CONFIRM_BETSLIP_BUTTON Confirming Betting Slip Confirming a betting slip (as described with reference to step s12 of FIG. 5A) involves two variations, depending upon circumstances: namely, whether initiated by the secondary bettor 120, or in any case as the betting event draws closer in the absence of confirmation by the secondary bettor 120. These alternatives are described with reference to FIGS. 5D and 5E respectively.

Figure 5D:
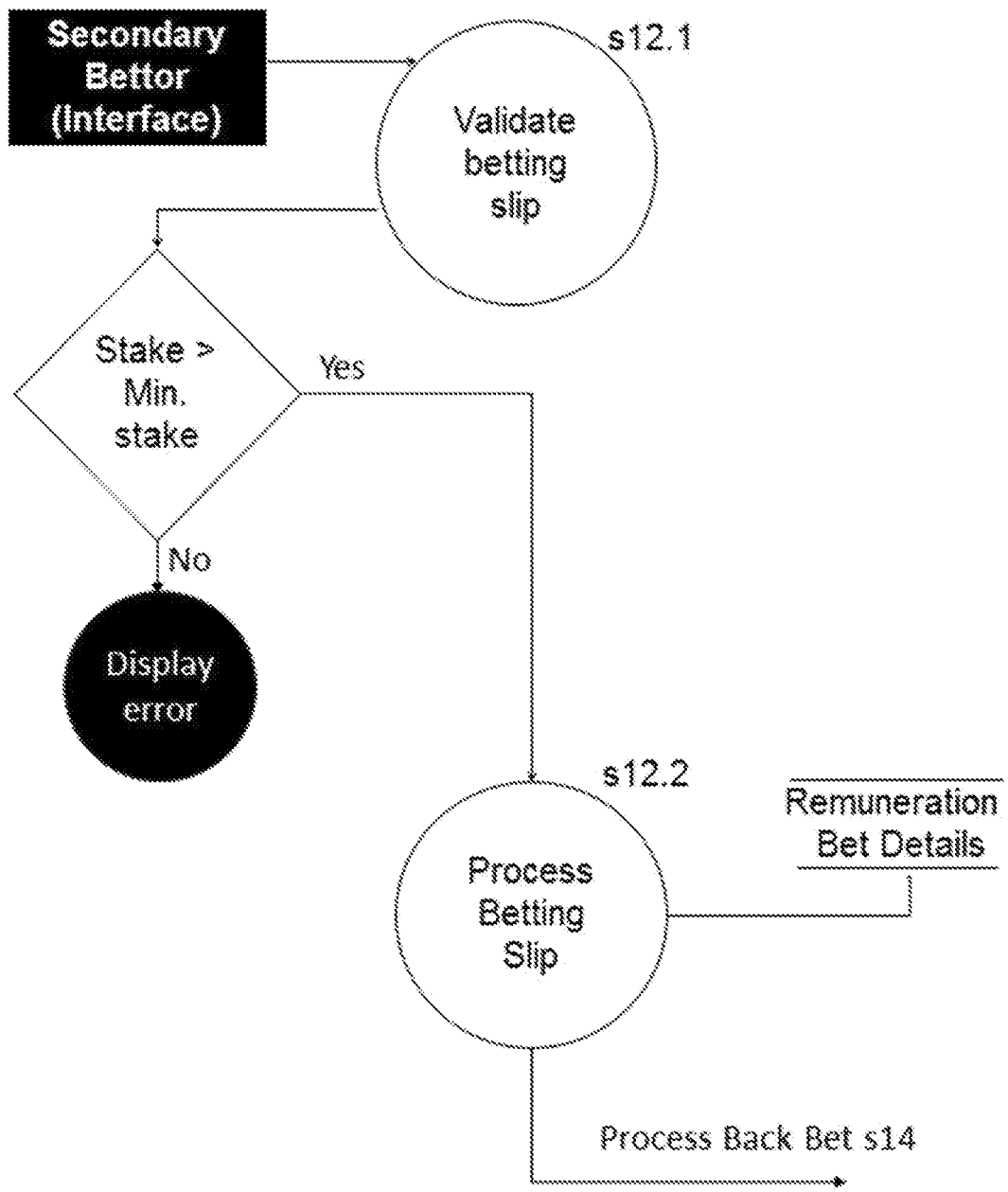

FIG. 5D is a flowchart of steps involved in confirming a betting slip when a secondary bettor specifically initiates this action, and TABLES 7 and 8 below provide pseudocode fragments relating to steps s12.1 and s12.2. These steps process a back bet betting slip that is initiated before the betting event closes by the user who is committed to bet after actioning a back bet advertisement. Validation of a betting slip is received in step s12.1 via the secondary bettor interface, and the betting slip is duly processed in step s12.2, subject to the stake being greater than the predetermined minimum amount. The back bet is processed as per step s14, as described in further detail below.

TABLE 7 below provides a pseudocode fragment relevant to step s12.1, namely validating a betting slip.

TABLE 7

(* user submits betting slip *)
Submit_Web_Form received from betting_slip_form
    If secondary_bettor_stake_amount is less than
    minimum_bet_amount TABLE 7-continued (*** stake amount entered in the betting slip isn't equal to or
greater than the minimum bet amount ***)
Display Minimum Bet Required Message
Call Display_Betting_Slip( )
    Else
        Call Process_Betting_Slip(next_betting_slip_id)
EndIf TABLE 8 below provides a pseudocode fragment relevant to step s12.2, namely processing betting slips.

TABLE 8

(* Check if the selection was changed in the betting slip *)
If secondary_bettor_selection is not equal to selection_id
    Set selection_changed to "YES"
    Set primary_bettor_id to "GENERIC" (*** the primary bettor's
    selection was not utilised therefore the server will distribute
    winnings from the remuneration bet to other primary bettors
    betting on the selection that thesecondary bettor changed to ***)
Else
    Set selection_changed to "NO"
EndIf
Set BETTING_SLIP.bettingslip_id to next_bettingslip_id
Set BETTING_SLIP.event_id to event_id
Set BETTING_SLIP bettor_identifier to secondary_bettor_identifier
Set BETTING_SLIP.selection_id to secondary_bettor_selection (*** the
user will either leave the selection displayed in the betting slip which is
taken from the primary bettor or he will change it to some other selection
available in the betting event ***)
Set BETTING_SLIP.stake_amount to secondary_bettor_stake_amount TABLE 8-continued Set BETTING_SLIP.bet_type to secondary_bettor_bet_type
Set BETTING_SLIP.back_bet to "YES" (*** indicates it is a back
bet ***)
Set BETTING_SLIP.selection_changed to selection_changed
Set BETTING_SLIP.status to "SUBMITTED"
UPDATE BETTING_SLIP
Call Process_Bet(bettingslip_id)

Figure 5E:
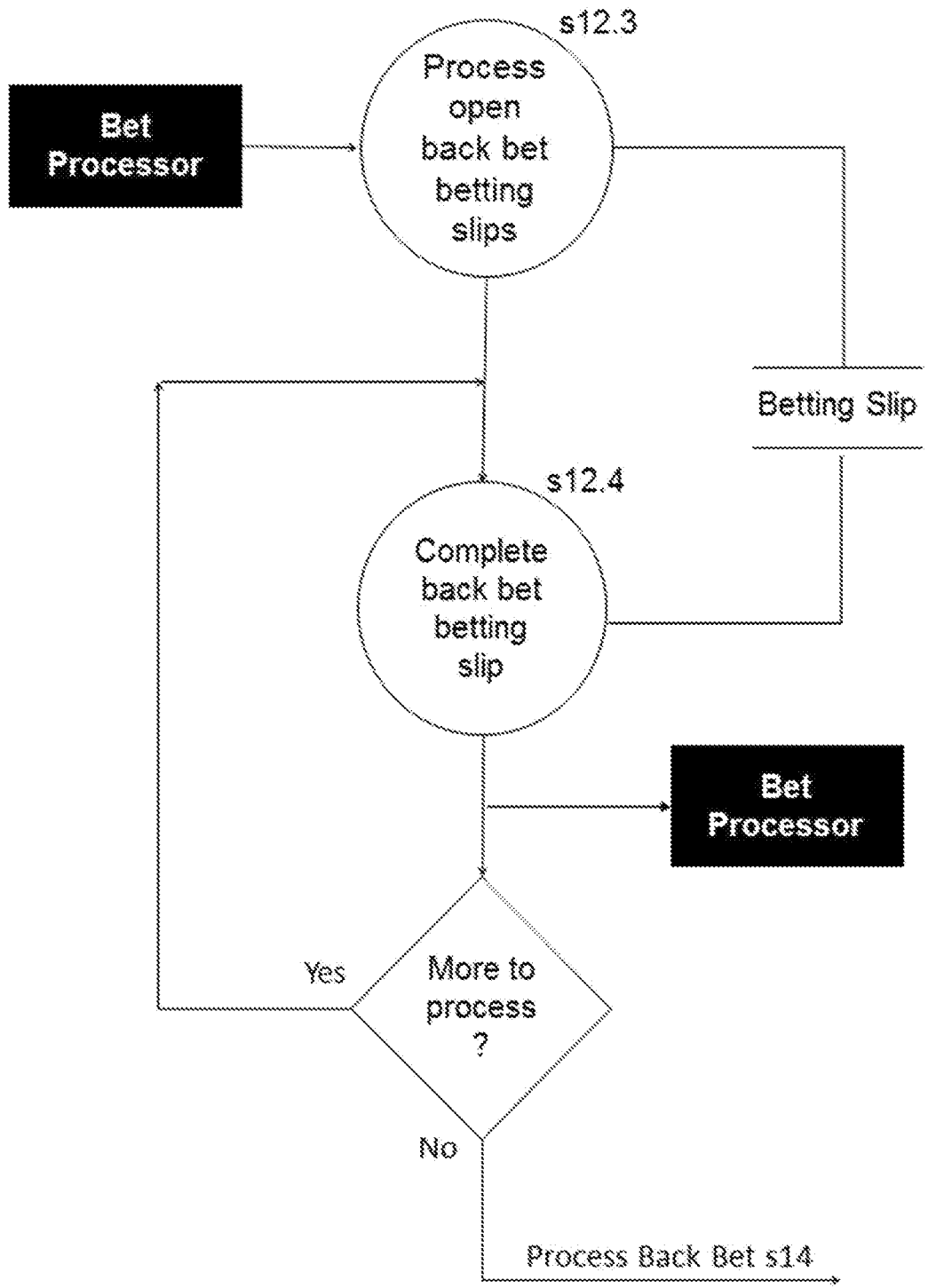

FIG. 5E is a flowchart of steps involved in confirming a betting slip when the bet controller specifically initiates this action, in the absence of confirmation by the secondary bettor 120. TABLES 9 and 10 below provide pseudocode fragments relating to steps s12.3 and s12.4. Processing of open back betting slips is initiated in step s12.3. This step processes back bet betting slips that have not been completed before the betting event closes and are triggered by the bet processor after the betting event has been preliminarily closed.

These back bet betting slips are each then completed in following step s12.4, which cycles as indicated until there are no further back betting slips to complete. Back bets are then processed according to step s14 as described below.

TABLE 9 below provides a pseudocode fragment relevant to step s12.3, namely processing incomplete back bet betting slips.

TABLE 9

Receive CloseEvent(event_id) (*** close betting event to server users
***)
Set status to "OPEN"
Set back_bet to "YES"
Read and Lock BETTING_SLIP table using event_id, status, back_bet
For each open BETTING_SLIP record
    Call Complete_Back_Bet_Betting_Slip(bettingslip_id)
EndFor
Send Complete_Event for event_id to Bet_Processor TABLE 10 below provides a pseudocode fragment relevant to step s12.4, namely confirming back bet betting slips.

TABLE 10

Set BETTING_SLIP.selection_id to BETTING_SLIP.primary_bettor_
selection_id
Set BETTING_SLIP.stake_amount to BETTING_SLIP.minimum_bet_
amount
Set BETTING_SLIP.primary_bettor_identifier to primary_bettor_id
Set BETTING_SLIP.status to "SUBMITTED"
UPDATE BETTING_SLIP
Call Process_Back_Bet(bettingslip_id)

Processing Back Bets

Figure 5F:
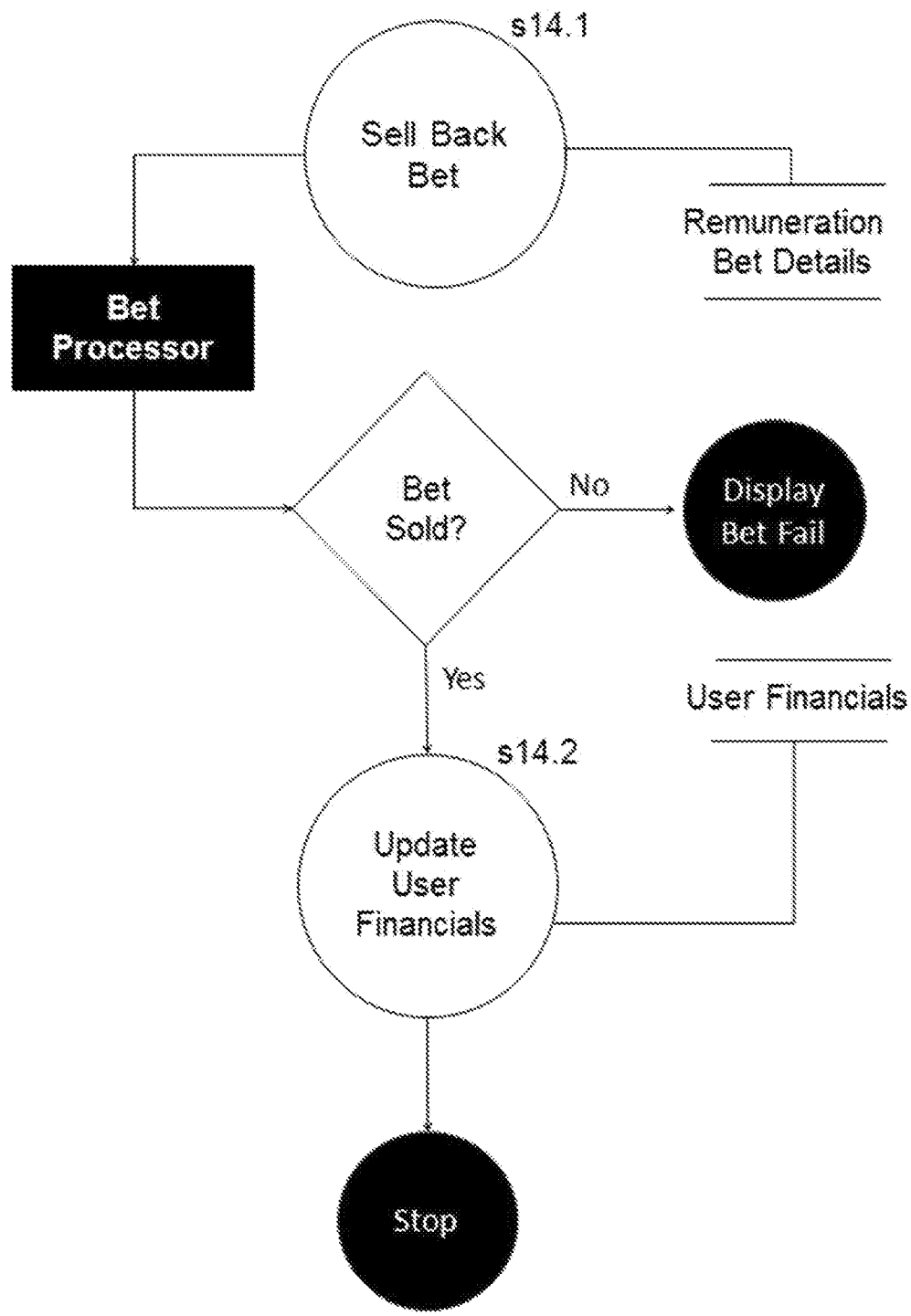

FIG. 5F is a flowchart of steps involved in processing back bets, as outlined as step s14 and described with reference to FIG. 5A. Back bets are sold into the bet processor 320 in step s14.1, and a user's financial records are updated accordingly in steps s14.2.

TABLE 11 below provides a pseudocode fragment relevant to step s14.1, namely selling back bets.

TABLE 11

Read BETTING_SLIP using next_bettingslip_id
Read and Lock USER_FINANCIALS table record using bettor_identifier
(*** split the bet amount into the secondary bettor's bet and the
remuneration bet amount ***)
FRACTION = a predetermined percentage of the back bet stake TABLE 11-continued Set bet_amount_less_rem_bet = BETTING_SLIP.stake_amount less
(FRACTION x BETTING_SLIP.stake_amount)
(* secondary bettor's bet amount *)
Set remuneration_bet_amount = (FRACTION x BETTING_SLIP.stake_
amount)
(* remuneration bet amount *)
(* sell the bets *)
Call Bet_Processer using current BETTING_SLIP record for an amount
of bet_amount_less_rem_bet (* sell secondary bettor's bet *)
Call Bet_Processer using current BETTING_SLIP record for an amount
of remuneration_bet_amount (* sell remuneration bet *)
If Bet is successful
    (* update the user's financial records to reflect the sold bet *)
    Call Update_User_Financials(bettor_identifier)
Else
    Call Bet_Fail_Error(BETTING_SLIP.bettingslip_id)
EndIf TABLE 12 below provides a pseudocode fragment relevant to step s14.2, namely updating a user's financial records.

TABLE 12

(*** clearing the credit note which reserved the minimum bet amount and
restoring the account balance ***)
Set USER_FINANCIALS.balance to balance less minimum_bet_amount
Set USER_FINANCIALS.tran_type to "CREDIT_NOTE"
Set USER_FINANCIALS.bettingslip_id to next_bettingslip_id
Set USER_FINANCIALS.transaction[last_transaction].tran_amount to zero
UPDATE USER_FINANCIALS table record using secondary_bettor_
identifier, tran_type, bettingslip_id
(** charge the user's account for the qualified bet amount *)
Increment last_transaction
Set USER_FINANCIALS.tran_type to "BACK_BET"
Set USER_FINANCIALS.bettingslip_id to next_bettingslip_id
Set USER_FINANCIALS.balance to balance plus secondary_bettor_stake_
amount
Set USER_FINANCIALS.transaction[last_transaction].tran_amount to
secondary_bettor_stake_amount
Save and Unlock USER_FINANCIALS table record using
secondary_bettor_identifier, tran_type, bettingslip_id Remuneration Bets The bet controller will settle the secondary bettor's bet using the original stake less the fraction of the stake applied to the remuneration bet. This return may then be communicated as the original stake at reduced odds (refer TABLE 13).

If the selection provided by a single primary bettor 110 is used by a secondary bettor 120 after committing to bet and confirming the bet slip, then the server 1 will also settle the fraction of the bet placed on behalf of the primary bettor(s) 110 by the server 1. The return from this remuneration bet is added to the return from their own bet placed on the selection (refer TABLE 16).

Some remuneration bets may include information from more than one primary bettor. Settlement of proceeds from such remuneration bets is resolved to apportion these funds. The bet controller 310 acts to send the remuneration bet details to the bet processor 320, and the proceeds to be settled, for the time being into a holding account, from which a final settlement is resolved amongst accounts of participating primary bettors 110.

The server can, for example, be configured to accommodate specific circumstances:
   i. the back bet advertisement actioned by the secondary bettor 120 is a consensus bet representing information from multiple primary bettors 110. For example the most popular selection from the Top 5% of bettors based on profit over a predetermined period of time, typically a rolling window backdated from the present;

ii. the secondary bettor 120 changes their selection in the betting slip to another outcome in the betting event other than the selection made by the primary bettor 110.

The server in case (i) apportions the return from the remuneration bet according to a weighting method. The weighting method can be influenced by the bet amount from the primary bettor 110, how early the primary bettor 110 placed his bet, the status of the primary bettor 110 in the server 1 and other factors. After the server 1 determines the weightings apportioned to each primary bettor 110, the return from the remuneration bet is distributed accordingly.

The server in case (ii) resolves apportionment according to those primary bettors 110 who recorded primary bets featuring betting selections that match the outcome to which the secondary bettor 120 switched their betting selection to in the confirmed betting slip. Apportionment of funds proceeds similarly as for case (i).

Winnings related to the secondary bettor's back bet at reduced odds and the original bet of the primary bettor(s) 110 plus their remuneration bet from any back bets are settled in step s16. The primary bettor 110 views his collective winnings from his original bet and the proceeds from back bets as a single bet with enhanced odds in step s17. Secondary bettors 120 view their back bet at reduced odds to compensate the primary bettor 110 for using their information in step s17.

A primary bettor may place a bet in step s8, view their enhanced odds in step s13, and also view settled bets in step s17, all using the primary bettor interface 210. A secondary bettor 120 may commit to back bet in step s11, view their odds in step s15, and view their settled back bets in step s18, all using the secondary bettor interface 220. It is the bet controller 310, interfacing with the bet processor 320 that processes backable bets in step s9, processes back bets in step s14 and settles bets in step s16.

Future Back Betting Variation

Figure 6A:
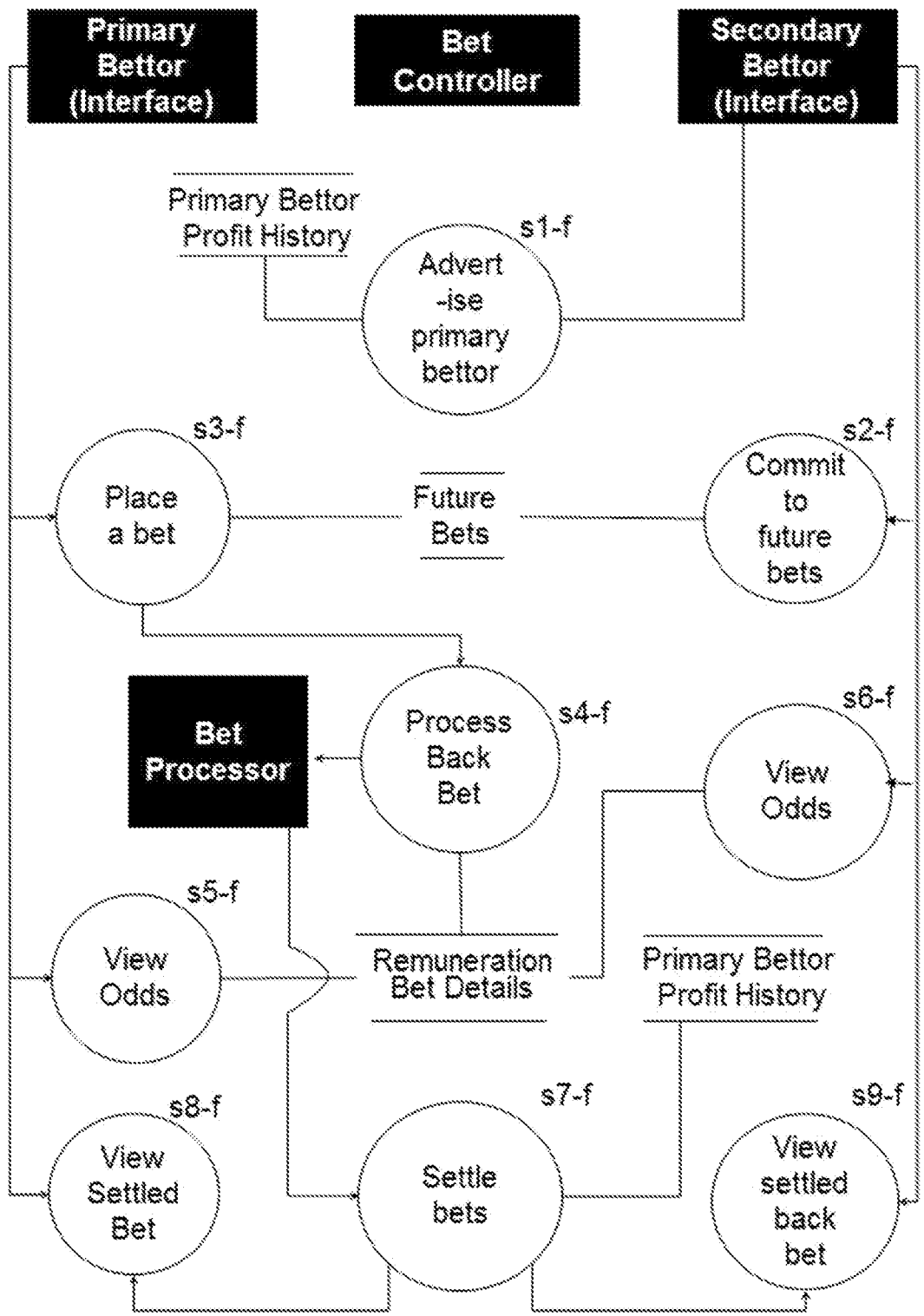
FIG. 6A is a flowchart depicting steps involved in a variation of back betting depicted in connection with FIG. 5A termed future back betting.

FIG. 6A depicts a process flow similar to that of FIG. 5A, incorporating a variation referred to as future back betting. As described in general terms above, the server 1 can allow secondary bettors 120 to back bet a primary bettor 110 whether or not the primary bettors are yet to actually register their betting selections. When primary bettors 110 are yet to register their betting selections subject of a back bet offer, this variation is termed future back betting.

The server 1 implements a structured mechanism by which secondary bettors 120 can provide an indication of acceptance of a back bet offer relating to yet to be determined (that is, anticipated) betting selections to be made by primary bettors 110.

The server 1 delivers via the secondary bettor interface 220 an option for secondary bettors 120 to indicate the number of bets they wish to future back bet, and the stake on each. After the secondary bettor 120 enters the details and actions the screen on their client device 4, the server 1 checks to ensure that the stake amounts entered by the secondary bettor 120 for each future back bet are equal to or greater than the minimum stake amount permitted for an individual back bet, that the secondary bettor 120 is qualified to bet in the server 1 and that the secondary bettor has sufficient funds in their account to commit to the total of all future bet stakes.

Should the above conditions be met, the server 1 creates a credit note against an account of a secondary bettor 120. The credit note is indexed using the unique system identifier of the primary bettor 110, and commits the funds in an amount of the credit note equal to the total of the future bets to be registered by the primary bettor 110 in the server database 2. As a consequence, less funds are available for other purposes in the account of the secondary bettor 120.

Figure 6B:
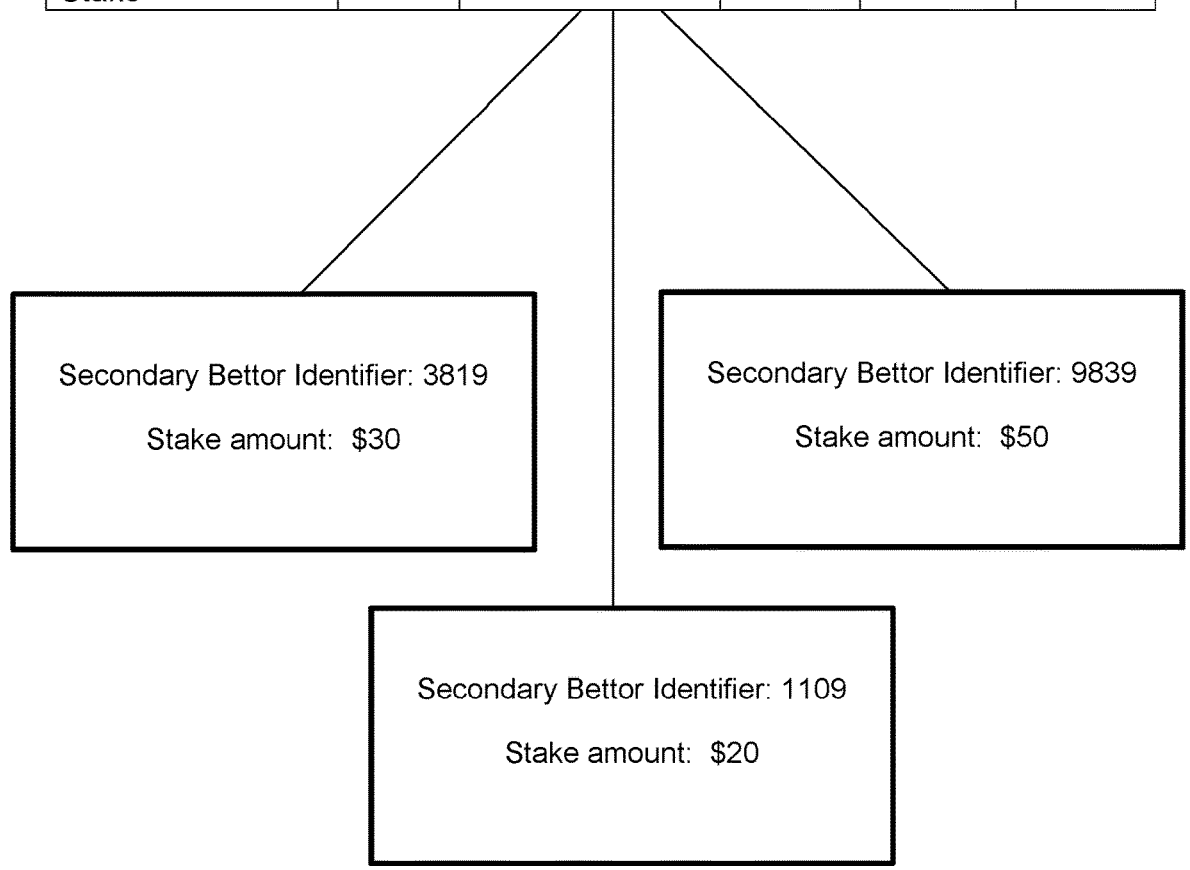
FIG. 6B is a diagram depicting a queue server used to record and access future back bets according to the server outlined in FIG. 6A.

The server 1 records the details of each future bet to a queue retained on the server 1 which is indexed by the unique identifier of the primary bettor 110 and a number that indicates the position in the sequence of future bets for the primary bettor 110 that to which the detail relates (as indicated in FIG. 6B). Details retained for each future bet in the queue include a 'total future bet stake' amount that represents the total of all stakes placed as future bets for each bet in the future sequence of bets for the primary bettor 110.

The data record for a primary bettor 110 and the position in the future sequence of bets also contains an array of data with each array element representing the detail that makes up the 'total future bet stake' including a unique identifier of the secondary bettor 120 who placed their future back bet and the future back bet amount, which is a portion of the total future back bet stake.

Future back bets are placed in a similar manner with the 'regular' Process Back Bet process (FIG. 5 step s14). The bet controller 310 in effect consolidates the remuneration bet amount, which is a fraction of the total of all betting stakes placed as future back bets for that bet in the future sequence of bets, with the stake of the primary bettor 110, and transmits a bet request to the bet processor 320 using the betting selection of the primary bettor 110.

The credit note created in response to the secondary bettor 120 committing to a future bet is updated by decrementing the credit note by the amount placed on the future bet using a similar method to that outlined for the regular back betting process indicated above in connection with step s14.2, and accompanying pseudocode fragment at TABLE 12. After updating the details recorded for the credit note, its new amount reflects all remaining stakes that the secondary bettor 120 has committed to the future bets of the primary bettor to be registered in the database server 2.

The return from a winning bet can be communicated to the primary bettor 110 through the primary bettor interface 210 as enhanced odds as described for the regular back betting method.

The bet controller 310 then also co-ordinates a second bet against a generic account recorded by the server 1 for the 'total future bet stake' less the fraction used for the remuneration bet. After official results are through for an event the server settles all future bets (FIG. 6A step s7-f).

The bet controller 310 settles all winning bets from secondary bettors 120 by accessing the future bet queue file as indicated in FIG. 6B using the bet sequence identifier and the primary bettor identifier to access the secondary bettor's unique identifier and stake amount in the sequence. The retrieved information is used to settle the secondary bettors' future bets into their account using a similar method to that described in TABLE 13 below and settles corresponding bets placed by primary bettor(s) which includes a remuneration amount from future bets as per TABLE 21 below.

The stake of the primary bettor 110 and the remuneration bet component of the future back bet is settled as a partial return with enhanced odds pending. After the settlement process has completed for other back bets which were placed after the primary bettor's bet was placed (i.e. back bets which are not future bets as described in FIG. 5A step s16), returns from these remuneration bets are added to future bet settlements. Enhanced odds and final return amounts are updated as per FIG. 20 (ref 73 and ref 74).

Figure 19:
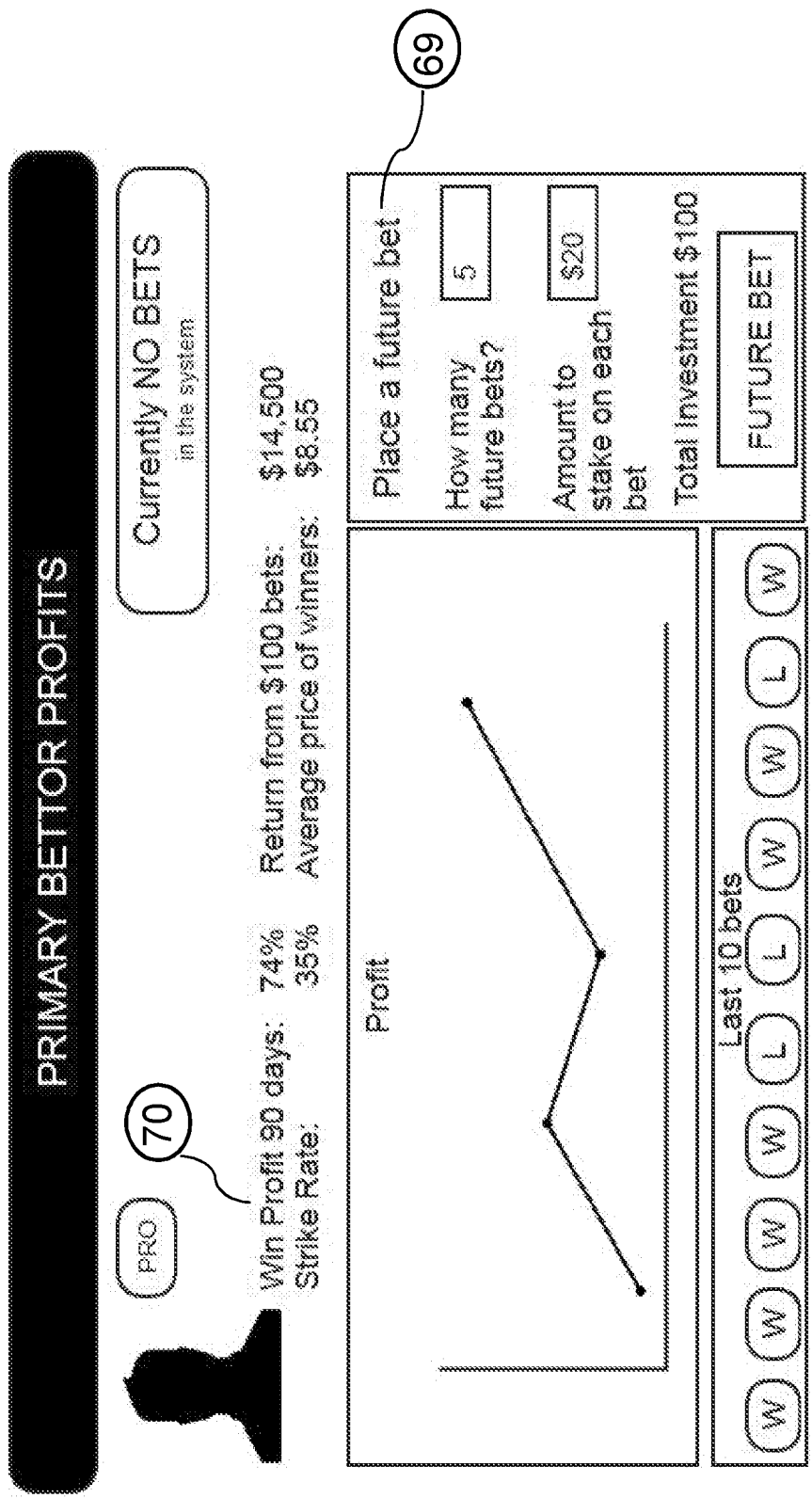
FIGS. 19 and 20 are further schematic representations of a client interface of the server of FIG. 1 relating to activities outlined in FIG. 6A.

The server 1 advertises profit statistics for primary bettors 110 using the betting profit history accumulated from bets and virtual bets placed in the server 1. This is indicated in FIG. 19, for step 1-f of FIG. 6A. A secondary bettor 120 can review primary bettor statistics ordered by various profit categories (FIG. 19 ref 70). If the primary bettor 110 has bets for events that are still open for betting, the secondary bettor can back bet those bets using the processes outlined in FIG. 5A. If the primary bettor does not have bets in the server 1 the secondary bettor 120 can back future bets from the primary bettor 110 by scheduling future bets to be processed by the server 1.

Sequence Diagrams

Figure 7:
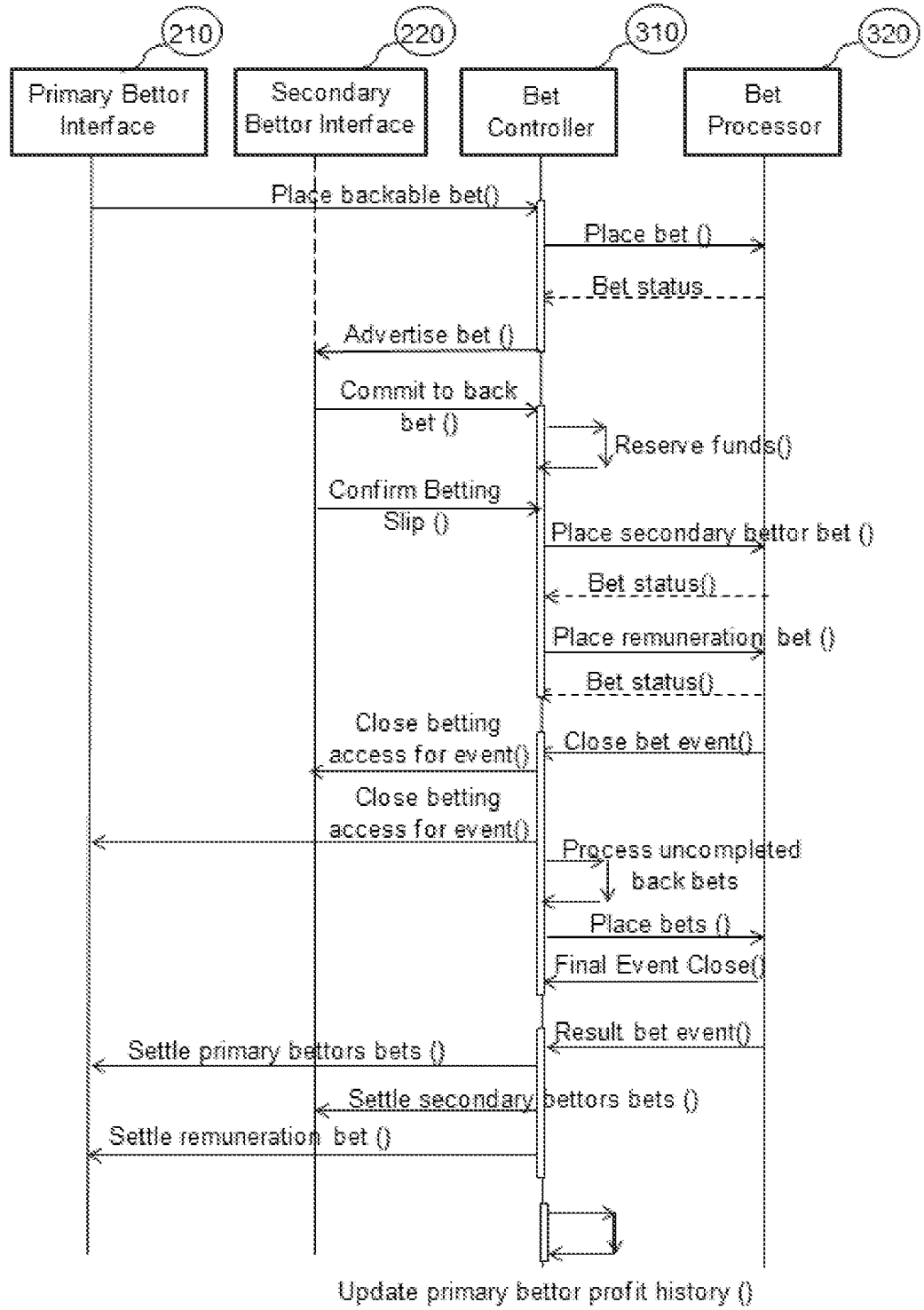
FIGS. 7 and 8 are sequence diagrams of steps involved in back betting and future back betting, which are associated with the flowcharts of FIG. 5A and FIG. 6A.
Figure 8:
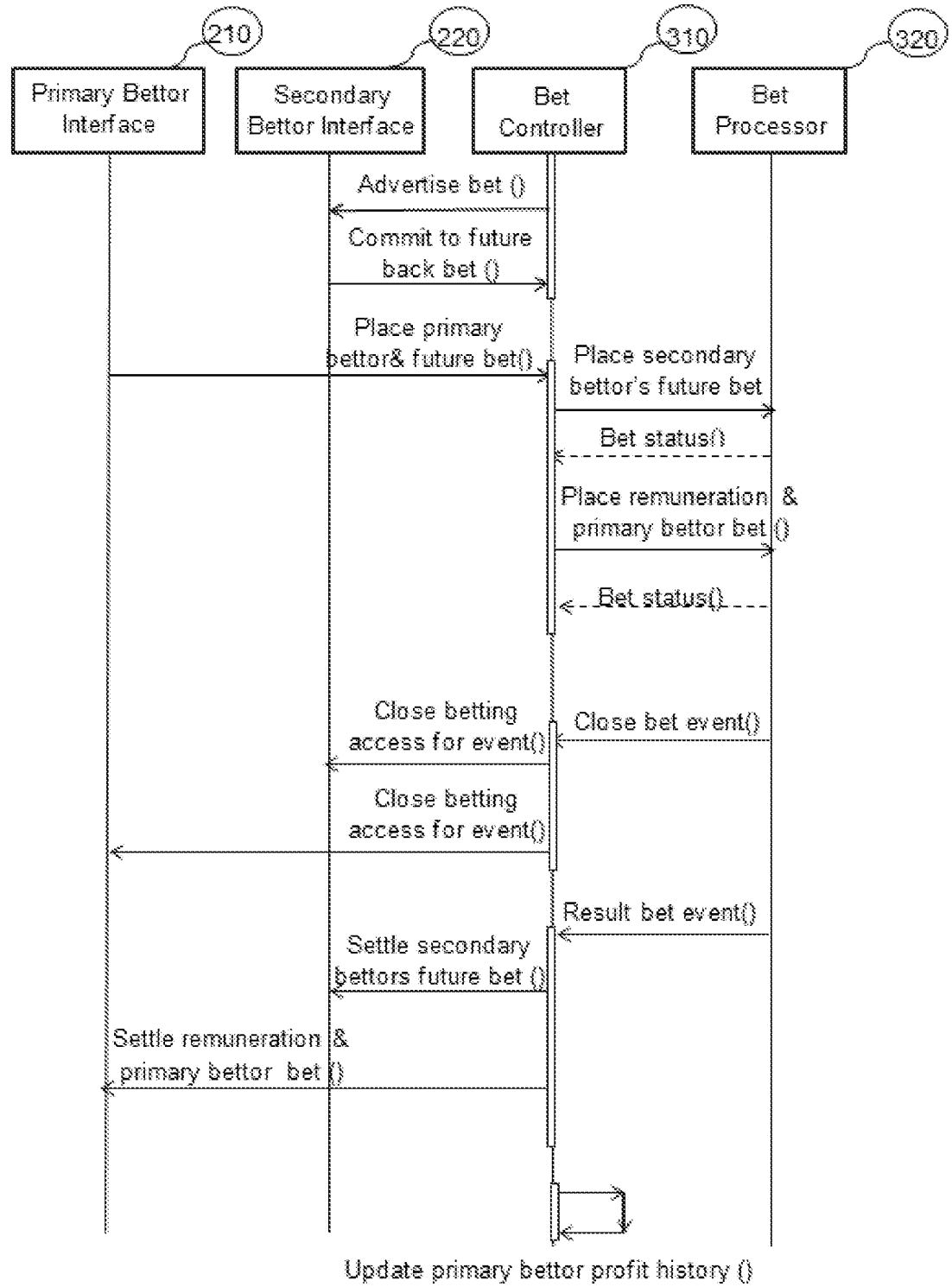

FIGS. 7 and 8 are sequence diagrams that depict the technical processes involved in the back betting and future back betting processes described above in connection with FIGS. 5A and 6A. The components of the server are as described above in connection with FIG. 3, namely primary bettor interface 210, secondary bettor interface 220, bet controller 310 and bet processor 320.

For FIG. 7, a backable bet request is placed with the bet controller 310 via the primary bettor interface 210. The controller 310 places the bet with the bet processor 320, which returns a bet status acknowledgement to the controller 310. The controller advertises the bet to the secondary bettor interface 220, once the bet status is received from the processor 320.

Once advertised, a 'commit to back bet' request may be received from the secondary bettor interface 220. The controller 310 checks to ensure the minimum bet amount is available in the account of the secondary bettor 120 and the status of the user record of the secondary bettor 120 to indicate that they have qualified to bet. If these criteria are valid the bet controller 310 deducts the minimum bet amount from the account of the secondary bettor 120 and creates a credit note for that amount which can only be used for a new betting slip number that is created in the server 1. The server 1 then reveals the betting information in the form of a betting slip transmitted to the secondary bettor interface 220 for review by the secondary bettor 120 on the client device 4. The betting slip is assigned a unique identifier by the server 1 which is linked to the credit note created to reserve the minimum bet amount. After the secondary bettor 120 performs an indication to bet on the betting slip display, the bet controller 310 accepts a confirmed betting slip data package and then calculates the stake amounts to place for both bets:
- the bet on behalf of the secondary bettor 120 which is less the fraction of the bet placed as a remuneration bet for the primary bettor(s) 110; and
- the remuneration bet for the primary bettor(s) 110 and places the relevant bets with the processor 320.

The bet processor 320 sends a preliminary close bet event message to the bet controller 310 which then closes betting for the event to the secondary bettor interface 220, and the primary bettor interface 210, restricting any further bets or back bets to be placed by users in the betting event on the server 1. The controller 310 checks for any uncompleted back bet betting slips for the betting event. For each open back bet betting slip the controller populates the betting slip data package using the primary bettor selection and the minimum bet amount reserved in the account of the secondary bettor 120 via the credit note and sends a request to process the bet with the bet processor 320.

A return bet status acknowledgement message is sent from the bet processor 320 after processing the bet. On receipt of a successful acknowledgement, the bet controller 310 updates the amount of the credit note linked to the betting slip from the account of the secondary bettor 120 to zero and also deducts any additional funds staked above the minimum bet amount reserved, from the account of the secondary bettor 120.

After all uncompleted back bet betting slips are processed, the bet controller 310 messages the bet processor 320 to indicate such, and then in return receives a final bet close message from the bet processor 320.

As the event is completed, the outcome of the event is adjudicated and finally settled—and the result of the bet event is issued by the bet processor 320. The bet controller 310 processes the outcome from the bets it placed with the bet processor 320 and performs calculations to determine the beneficiaries of the return from the remuneration bet and their respective shares, settling the accounts of the primary bettor 110 and secondary bettor 120, with respective settle bet messages issued via their respective interfaces 210, 220, based upon the result bet event message sent from the bet processor 320.

A settle remuneration bet message is also sent from the bet controller 310 to the primary bettor interface 210, based upon the result bet event message from the bet processor 320.

As the bet controller 310, the bettor history is updated, and this status may be updated through appropriate messaging (not shown) at both the primary and secondary bettor interfaces 210, 220.

For FIG. 8, in connection with future back betting, the procedure is similar in many respects to the procedure outlined for regular back betting described above with reference to FIG. 7.

Initially however, a (future) bet offer is advertised by messaging from the bet controller 310 to the secondary bettor interface 220. A future back bet offer is committed via the secondary bettor interface 220 and then scheduled for processing with the bet processor 320 by the bet controller 310, and held there for the time being. A primary bettor 120 then later places a future bet via the primary bettor interface 210 with the bet controller 310. This contingency then permits the bet controller 310 to process the future bet on behalf of the secondary bettor 120 with the bet processor 320, and an acknowledgement bet status message is sent in reply.

The future bet and remuneration bet are also transmitted for processing with the bet processor 320—on behalf of the primary bettor 110—by the bet controller 310, and bet status messages sent back from the bet processor 320 in reply.

Subsequent processing, involving closing of betting, issuing of results and placed bets are settled as described above in connection with FIG. 7.

User Experience
Primary Bettor—Places a Bet

FIG. 9 depicts a betting event screen. The server 1 uses betting information from primary bettors 110, who have consented to share their betting information using the server 1, for the benefit of secondary bettors 120. The betting information, which includes an event, a selection, a stake amount and optionally a comment, is collected when the primary bettor 110 places a bet or a virtual bet (FIG. 5A, step s8) through the betting event screen depicted in FIG. 9, as presented via the primary bettor interface 210.

The primary bettor 110 transmits an intention to bet by clicking or tapping the odds according to a betting selection for which the primary bettor 110 wishes to bet. For example, Richard, who is a primary bettor 110, wants to bet on selection number 3—which is indicated as Option C in FIG. 9 as ref 50.

Figure 10:
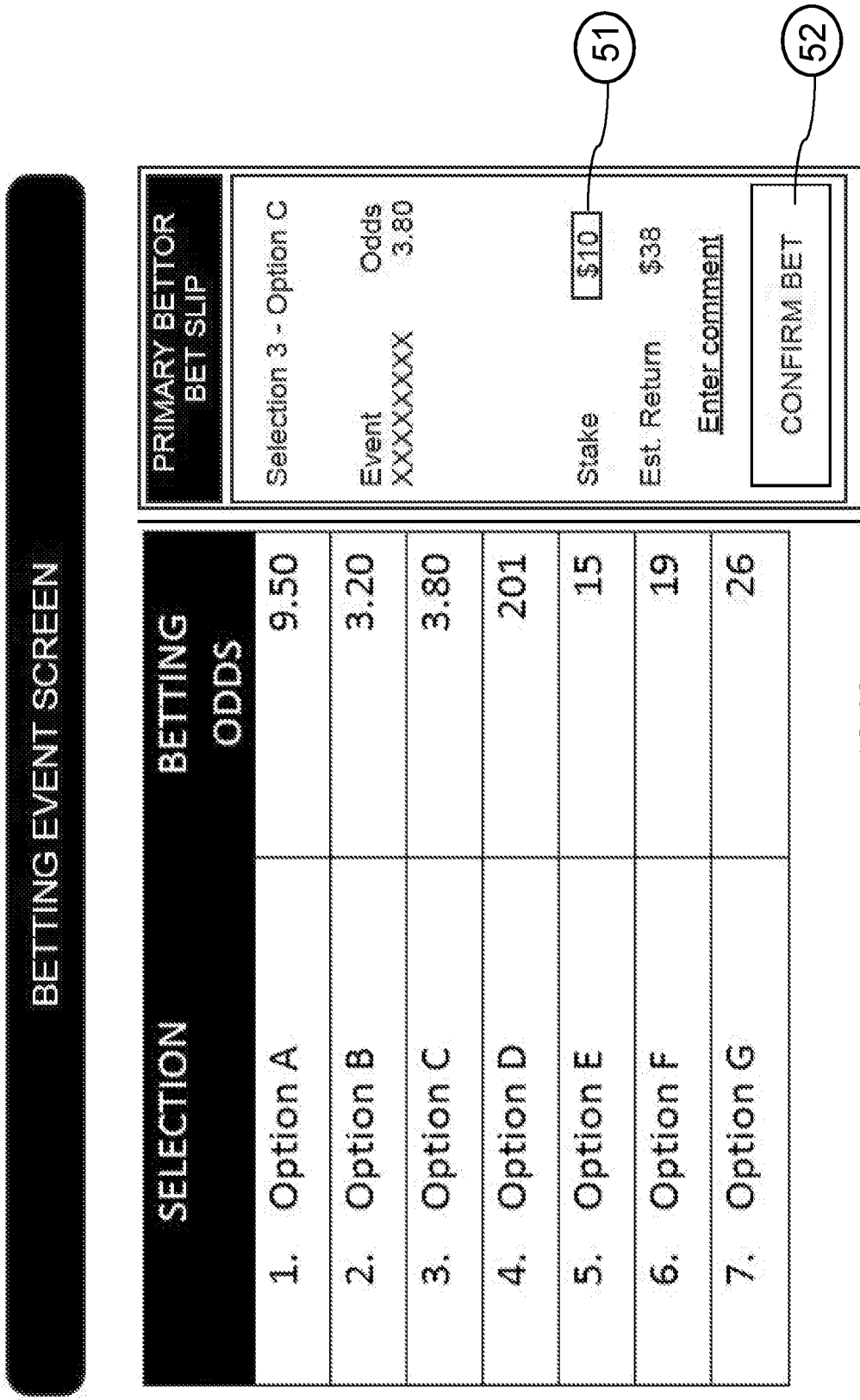

FIG. 10 depicts a screen, as a modified version of the screen of FIG. 9, which includes a bet slip for a primary bettor 110 containing this bet information. The primary bettor 110 adds a stake amount (FIG. 10, ref 51) and confirms the bet (FIG. 10, ref 52) by actioning the CONFIRM BET screen button indicated. As an example, indicated in FIG. 10, Richard places a $10 bet on Option C for an estimated return of $38.

Back Betting Server—Process Backable Bet

The bet request is sent to the bet processor 320 (FIG. 5A, step s9). If the bet meets requirements, the bet processor 320 records the bet and issues a bet receipt. As the person placing the bet is a primary bettor 110, having consented to share his betting information, the server 1 records the bet and adds it to the list of backable bets for the event.

Back Betting Server—Advertises Bets

Figure 11:
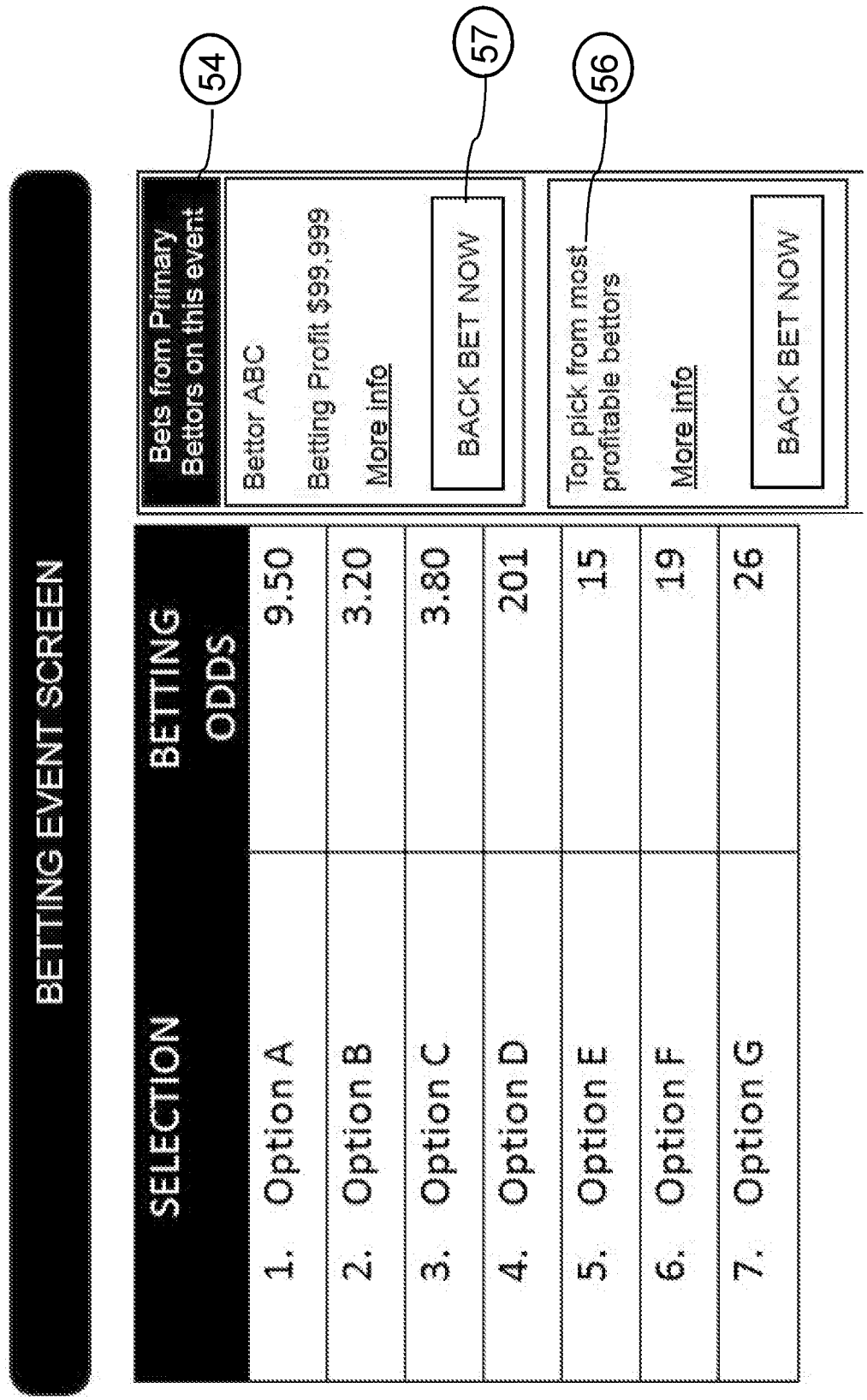

FIG. 11 depicts a screen, following on from those of FIGS. 5A and 6A, which indicates a betting event screen having advertisements for back bets, which is viewed by secondary bettors via the secondary bettor interface 220.

Backable bets are advertised (FIG. 5A, step s10) for the betting information taken from bets and virtual bets confirmed by each primary bettor for a particular event.

Betting profitability statistics are calculated for each primary bettor 110 and displayed on the relevant betting event page with the advertisement for the betting information of the primary bettor 110 (FIG. 11, ref 54). An alternative embodiment can display back bet advertisements on a page listing primary bettors 110 rather than betting event pages. The list may be shown in order of each listed betting performance of primary bettors 110 or some other relevant metric calculated by the server 1.

Information that highlights betting attributes of each advertised bettor (e.g. average price of winning bets) is displayed as a small window on the screen when the user clicks the 'More Info' link. The advertisements represent one or more selections available to be back bet for the event that the secondary bettor 120 has selected, where the information being used in the back bet is provided by a single primary bettor 110 or multiple primary bettors 110. Back bets from multiple primary bettors 110 are combined by the server to provide a consensus view of bettors e.g. Top selection of the top 5% of bettors (FIG. 11, ref 56).

Secondary Bettor—Commit to Back Bet

The secondary bettor 120 can place a back bet (FIG. 5A, step s11) by indicating an action (like clicking on a mouse button while hovering over the BACK BET NOW or tapping such area on the screen)(FIG. 11, ref 57) for the corresponding advertisement that appeals to them. If the secondary bettor 120 who sees the advertisements screen shown in FIG. 11 performs the action (click on or tap BACK BET NOW) then the server reads the balance of the account of the secondary bettor 120 and checks if it is greater or equal to the minimum bet amount required to back bet.

Figure 12:
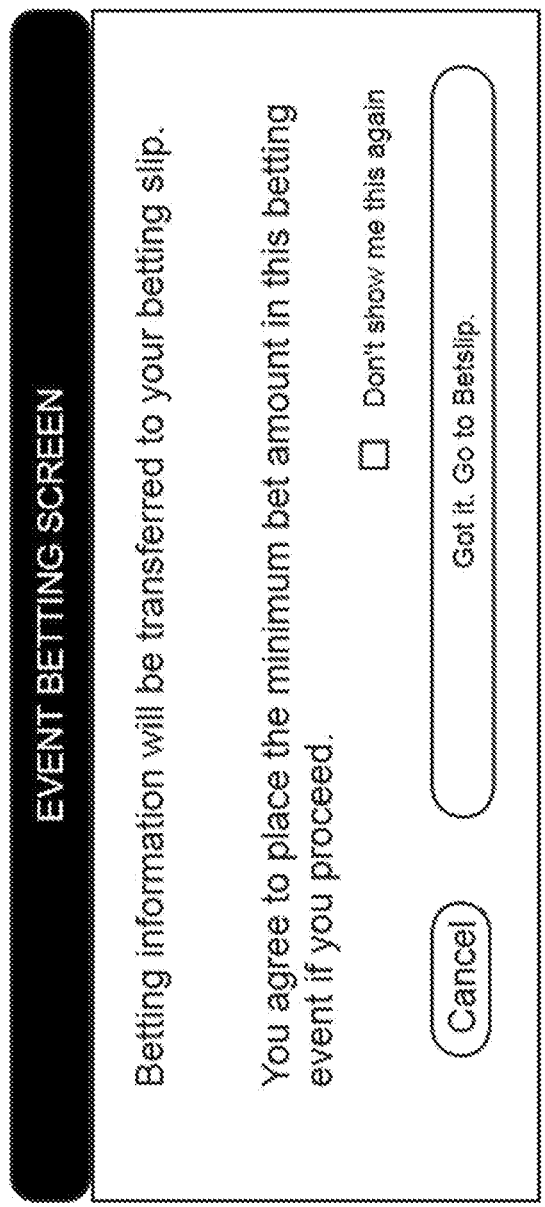

FIG. 12 depicts a screen seeking confirmation that the secondary bettor 120 is required to back bet the selection of the primary bettor 110 with at least the minimum back bet amount if they proceed past this point.

As an administrative matter, if the server 1 determines that the balance in the account of the secondary bettor 120 is less than the minimum bet amount they are taken to the deposit screen. If the user deposits at least the minimum deposit amount or if the balance after depositing an amount of funds into their account is equal to or above the minimum balance amount, a screen appears as shown in FIG. 12.

Secondary Bettor—Confirm Betting Slip

Figure 13:
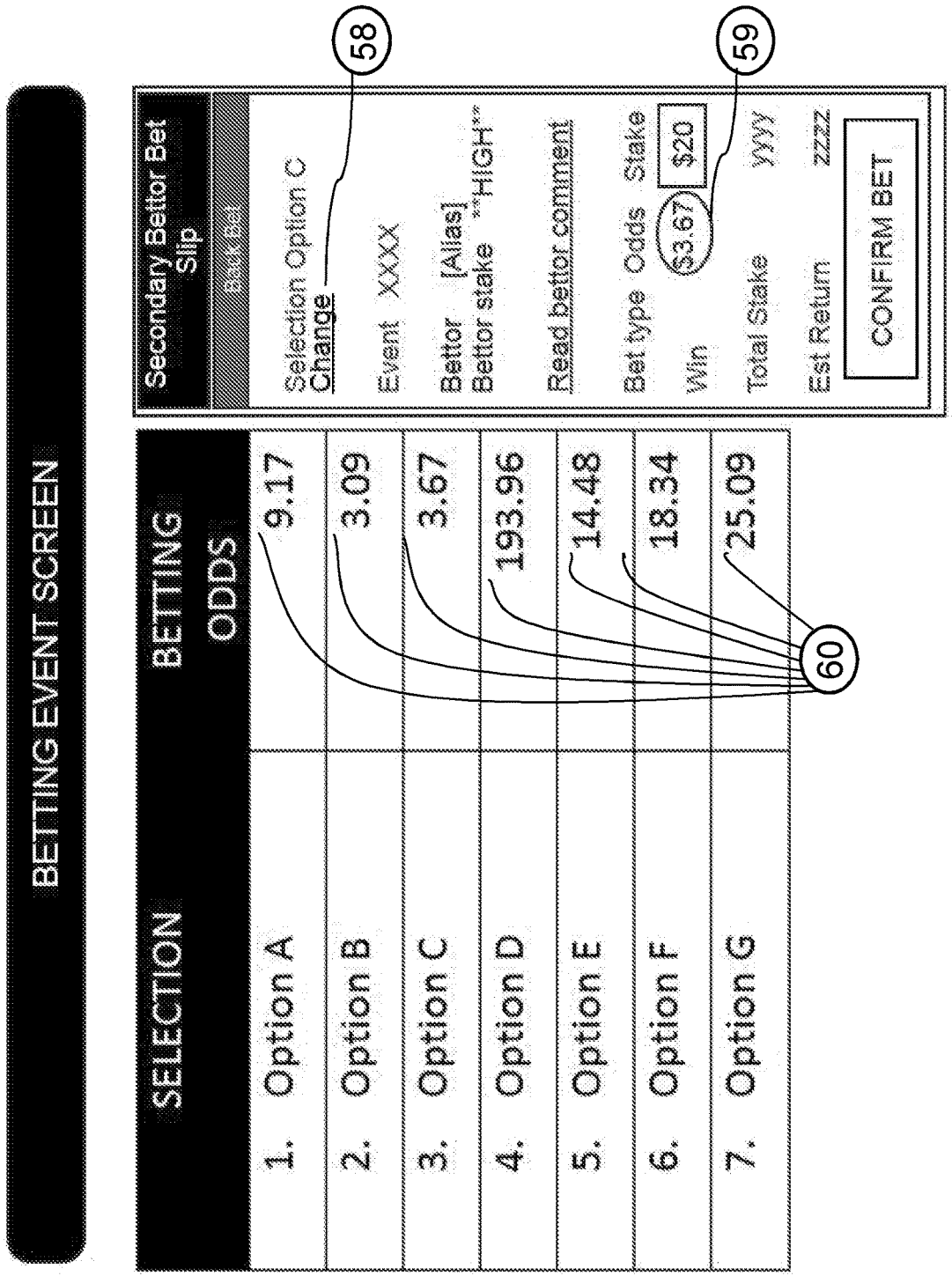

FIG. 13 depicts a bet slip screen for a secondary bettor 120, presented when he has acknowledged the screen depicted in FIG. 12. The server 1 responds to a secondary bettor's commitment to back bet by reserving funds equal to the minimum bet amount within their account via the creation of a credit note which can only be used in the related betting event, and then reducing the account of the secondary bettor 120 by that amount. These reserved funds can only be utilised by the secondary bettor 120 via the betting slip in the related betting event. The betting slip information is transmitted to the secondary bettor interface 220 revealing the betting information of the primary bettor(s) 110.

The entry in the bet slip is clearly labelled as a back bet and cannot be cleared or removed until the race has closed. If the secondary bettor 120 attempts to navigate away from the betting event screen relating to the back bet after confirming their intent to back bet, the server 1 will display a warning screen on the secondary bettor interface 220 informing them that they have uncompleted back bets.

If the back bet betting slip is not appropriately actioned by the time the betting event closes, the server will automatically place a bet on the secondary bettor's behalf for the minimum amount or in another variation of the server, the account will be charged the minimum bet amount as an access fee.

If the secondary bettor 120 completes the back bet betting slip for an amount equal to or higher than the minimum bet amount, the server 1 checks to ensure that there are sufficient funds available within the account of the secondary bettor 120 taking into consideration the amount reserved and the residual funds in his account. If there are sufficient funds to place the bet, the reserved funds represented by the credit note are utilised and the amount of the credit note is updated to be zero in their account and any other additional amount staked above the reserved amount is deducted from the account of the secondary bettor 120 and the account balance is updated accordingly. The bet transaction details appear in the account of the secondary bettor 120.

The information that appears in the bet slip includes the selection(s) relating to the primary bettor(s) being back bet, the bet type(s) for the bets placed on the selection, an indication of the relative size of the stake placed by the primary bettor 110 and any comments added by the primary bettor 110. The odds of each back bet (FIG. 13, ref 59) will be automatically adjusted downwards to allow for a portion of the winning back bet to be remunerated to the primary bettor 110. A button to indicate action to confirm the bet slip and to change the selection also appear in the betting slip.

Having now committed to bet in the betting event, the server 1 provides the secondary bettor 120 with an option to change the selection from the primary bettor's betting selection. The secondary bettor 120 actions the betting slip to change the selection (FIG. 13, ref 58) and control is transferred to the list of betting options in the betting event screen (FIG. 13, ref 60). The odds appearing in the betting event screen (FIG. 13, ref 60) are adjusted downward to allow for a remuneration bet to be placed on behalf of primary bettors who backed the selection that they may choose to change to.

A user can change the selection by clicking the odds corresponding to the selection they wish to change to. They can effectively cancel the change operation by selecting the odds corresponding to the primary bettor's selection. The server 1 returns control to the betting slip when a selection is made and if a new option is selected, the server 1 displays it in the betting slip.

The server 1 will settle winnings from changed selections to primary bettors 110 who placed a bet on the same selection in the event using a weighting method similar to that described in TABLE 18.

An example of a secondary bettor 120 placing a back bet—if Alex clicks an advertisement for a bettor who bet on Option C then the odds of $3.80 offered at the time will be reduced. The percentage of remuneration to the primary bettor(s) 110 can be set at any level, however this example assumes it is set at 3.5% of the return from a winning back bet. If Alex places a $20 bet, which must be higher than the minimum back bet stake allowable, then the odds showing for Alex's back bet will be $3.67 (FIG. 13, ref 59).

Assuming fixed odds is used to calculate Alex's odds, which locks in odds offered at the time the bet is placed, this is calculated as per TABLE 13 directly below.

TABLE 13

Bet placed without reduced betting odds for back bet =
$20 × $3.80 = $76
Return that Alex receives from his bet if the selection wins =
$76 − ($76 × 3.5%) = $73.34
Alex's return of $73.34 converted to reduced betting odds =
$73.34 / $20 = $3.667 (rounded to $3.67).

If the bet type that Alex chooses when placing his bet is a fluctuating bet type, where the odds change up till the event is closed, then the back bet odds is recalculated by applying the above formula to the final fluctuating odds.

Back Betting Server—Process Back Bet

The server processes each back bet (FIG. 5A, step s14) by breaking it up into two bets. A bet at reduced odds for the secondary bettor 120, and a remuneration bet for the primary bettor 110.

The first bet represents the actual back bet at reduced odds. Using the example above the amount sent to the bet processor 320 for the back bet is the portion of the $20 that equates to a return of $73.34 with betting odds of $3.667. The first bet sent to the bet processor therefore equates to a $19.30 bet for Alex calculated as set out in TABLE 14 below.

TABLE 14

Adjusted secondary bettor stake amount = $73.34 / $3.80
(market-fixed odds when bet placed) = $19.30

The second bet is placed to remunerate the primary bettor(s) 110 who added value to the decision of the secondary bettor 120 in the back betting process or who are determined to be beneficiaries by the server 1. Using the example above the second bet equates to $0.70 at the market-fixed odds of $3.80 calculated as set out in TABLE 15 below.

TABLE 15

Remuneration bet amount
=Original back bet amount − Adjusted secondary bettor stake amount
=$20.00 − $19.30
=$0.70

The remuneration bet is placed for the primary bettor(s) 110 who are beneficiaries. Winnings from these bets are distributed to these primary bettors 110 as part of the Settle Bets process (FIG. 5A, step s16).

Both bets are sent to the bet processor 320 for processing.

After bets are placed, a receipt is sent to the secondary bettor 120 to indicate that the bet is sold.

Primary Bettor—View Odds

FIG. 14 depicts a screen indicating enhanced odds of the primary bettor 110 for the particular event following FIGS. 9 to 13. As outlined above, each time a back bet is placed, the server 1 is placing part of the staked amount as a separate remuneration bet, in effect on behalf of the primary bettor(s) 110. If the remuneration bets win, the pay-out from these bets will be distributed to the primary bettor(s) 110 whose betting information was used in the back bet process, or if the selection was changed in the back bet betting slip, those primary bettors 110 who the server 1 deems are beneficiaries of winning remuneration bets.

The potential returns to primary bettors 110 are automatically calculated (FIG. 5A step s13) as each back bet is placed, and communicated to each primary bettor beneficiary, as enhanced odds, as depicted in FIG. 14.

As an example, if Richard originally placed a $10 bet as a primary bettor 110 through the server 1 on Option C (FIG. 9, ref 50) and the odds were fixed such that they were set at $3.80. Then if the bet won, without any proceeds from back bets considered, he would stand to receive: $38=$10×$3.80

If Alex's back bet used Richard's betting information then $0.70 of Alex's bet is placed on Option C for Richard. In this case it was also at fixed odds of $3.80 increasing Richard's return by $2.66 (i.e. $0.70×$3.80) (FIG. 14 ref 61).

If the bet wins the server 1 will return Richard $40.66 for his selection which represents $38 return from his own bet plus $2.66 remuneration for Alex's back bet. This can be communicated—as an example—as enhanced odds of $4.06 (FIG. 14 ref 60) to Richard. The calculation for Richard's enhanced odds is set out below in TABLE 16.

TABLE 16

Total return = $40.66 (Original bet, $38.00 + Remuneration bet, $2.66)
Initial bet amount = $10
Enhanced odds = $40.66 / $10 = $4.06

Secondary Bettor—View Odds

Figure 15:
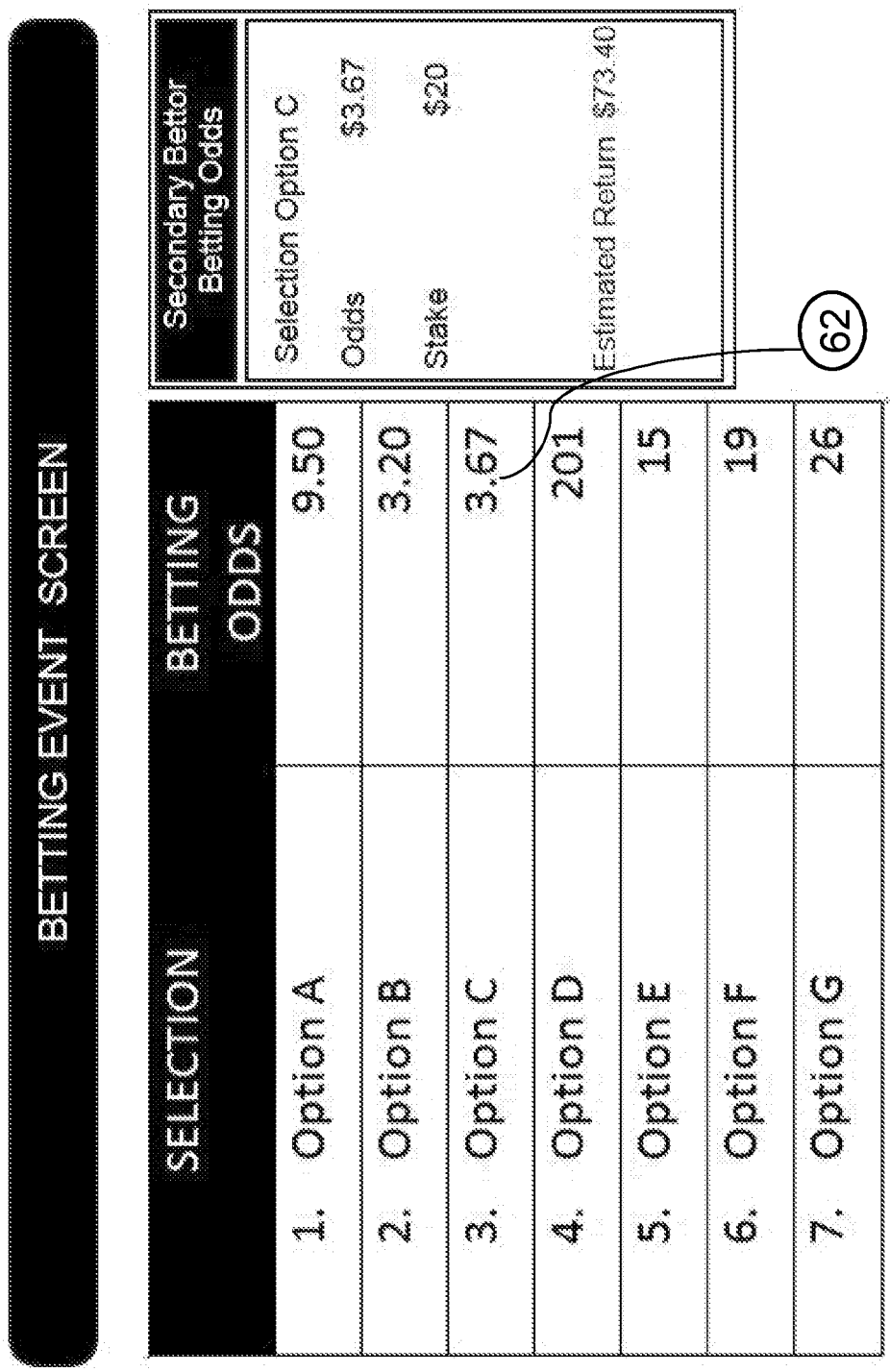

As outlined above, the reduced odds communicated to the secondary bettor 120 when placing a back bet (FIG. 13, ref 59), are displayed as pending bet information that the secondary bettor can view at any time prior to the event being completed and settled (FIG. 5A, step s15), as indicated in FIG. 15.

The reduced odds received by the secondary bettor 120 for the back bet will continue to be displayed on the betting event screen. If the secondary bettor 120 chooses to bet on the same selection as used in the back bet again, they will receive the reduced odds displayed on the current betting event screen (FIG. 15, ref 62).

Settle Bets

Figure 16:
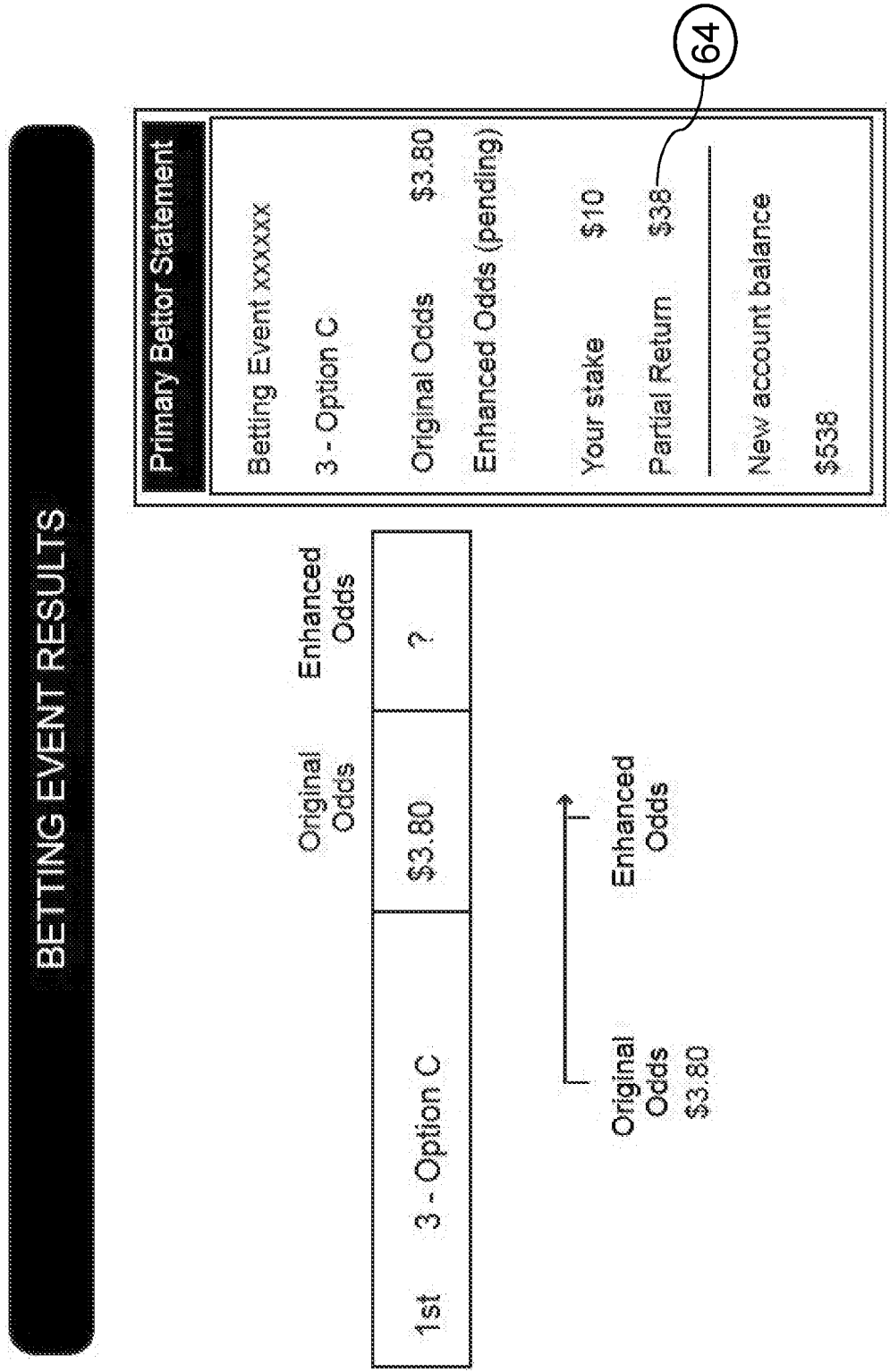

FIG. 16 depicts a screen display generated via the primary bettor interface 210, displaying settled winning bets placed by a primary bettor 120.

After official results are through for an event the server 1 settles all winning bets (FIG. 5A, step s16). This includes regular winning bets that are not involved in a back betting transaction.

The bet processor 320 settles all winning bets placed by a primary bettor 110 submitted via the process described above in connection with a primary bettor 110 placing a bet.

These bets are displayed to the primary bettor in a statement, as depicted in FIG. 16. If the primary bettor 110 has been back bet then the bet will first partially settle showing only the bet settlement from their own staked amount (ref 64).

Figure 17:
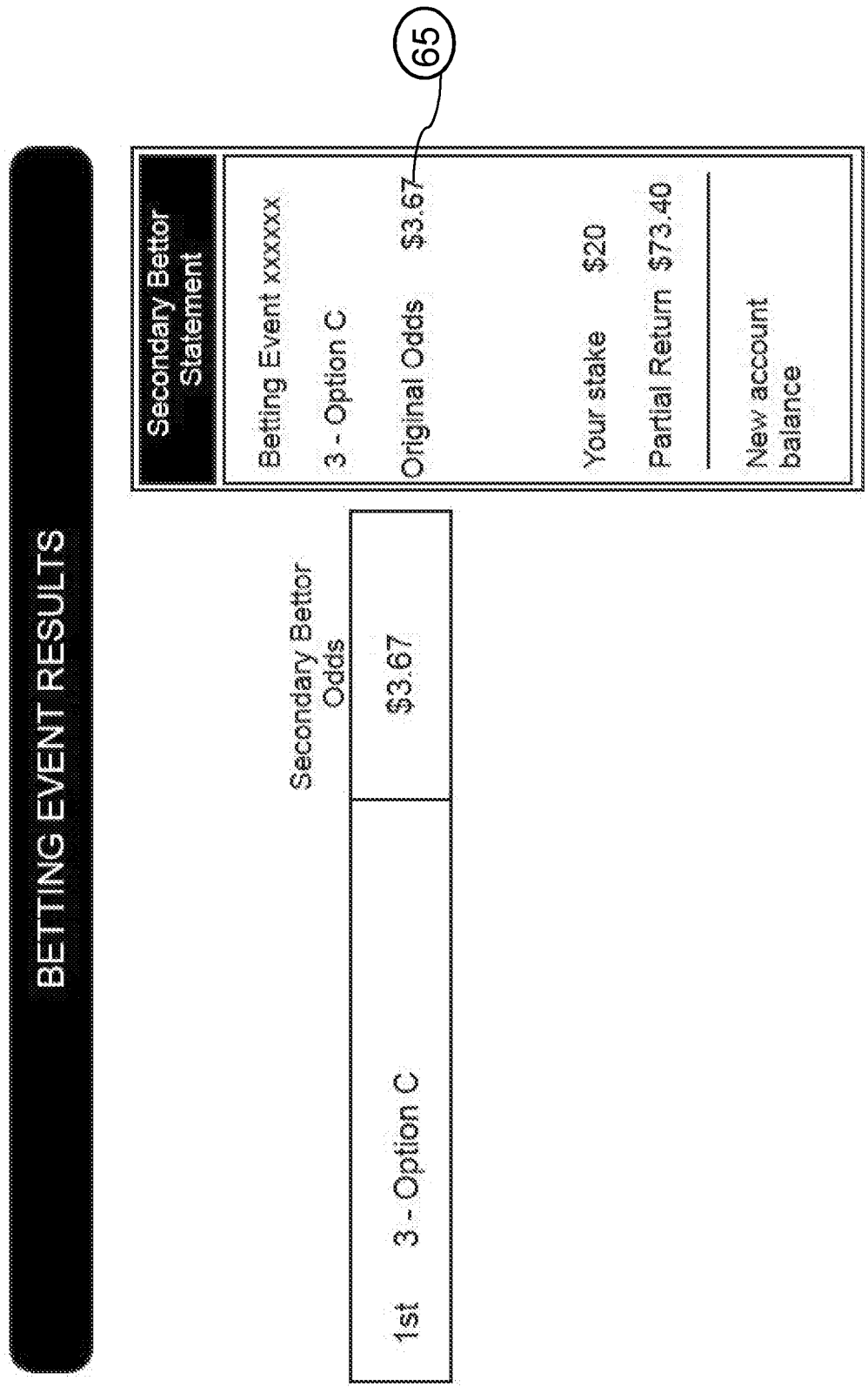

Winning bets placed by secondary bettors 120 are also settled by the bet processor 320. These bets were placed with a stake that is less the amount required for the remuneration bet and are shown as the full stake amount at reduced odds (FIG. 13, ref 59). The secondary bettor 120 receives a similar statement of results FIG. 17 which is finalised at the reduced back bet odds (ref 65).

The server 1 will also settle the remuneration bets, the second bet placed when the back bet was processed (FIG. 5A, step s14). If the betting information used in the back bet was provided by a single primary bettor 110 then the entire return from the related remuneration bet is settled into the corresponding primary bettor account. In the example, only Richard's information was used by Alex to place his bet on Option C so Richard receives the entire return from the remuneration bet i.e. $2.66 (as described above with reference to TABLE 16). If this was the only back bet on Richard's bet, his bet would be settled to return $40.66 at enhanced odds of $4.06 for his $10 bet.

Some remuneration bets may include information from more than one bettor. For example an advertisement highlighting a consensus bet from the Top 5% of bettors based on profit over a certain period of time. Or in the case where the secondary bettor 120 changes the primary bettor selection in the back bet betting slip, the server assigns the return from the winning remuneration bet to primary bettors 110 who bet on the new selection in the related betting event. In these instances the server will apportion the return from the remuneration bet according to a weighting method. The weighting method can be influenced by the bet amount from the bettor, how early the bettor placed his bet, the bettor's status in the server 1 and other factors. After the server 1 determines the weightings apportioned to each bettor, the return from the remuneration bet is distributed accordingly.

As an example, Damian places a $50 back bet using the screen shown in FIG. 11 and clicks "Top pick for most profitable bettors" advertisement (ref 56) and continues through to the bet slip to confirm the bet. The selection is for 3—Option C with original odds of $3.80. Using the method described above to commit to a back bet and confirm the back bet betting slip (FIG. 5A step s11 and s12) and using a 3.5% remuneration rate for primary bettors, the following return is calculated from Damian's bet, as set out in TABLE 17 below.

TABLE 17

Damian's (secondary bettor) return = $190 − ($190 × 3.5%) = $183.35
Remuneration bet return = $190 − $183.35 = $6.65
Total bet return = $50 × $3.80 = $190

In this example there are three primary bettors 110 whose betting information contributed towards the consensus information provided to Damian through the back bet. The server 1 determines weightings for each of the three contributing primary bettors 110 as follows in TABLE 18 below.

TABLE 18

Sebastian 45%, Karen 30% and Richard 25%.
The return from the remuneration bet is then distributed as follows

| | |
|---|---|
| Sebastian is distributed 0.45 × $6.65 | =$2.99 |
| Karen is distributed 0.30 × $6.65 | =$2.00 |
| Richard is distributed 0.25 × $6.65 | =$1.66 |
| Total distributed | $6.65 |

The server 1 calculates all distributions from each remuneration bet, and accumulates the amount owing to each primary bettor 110 and credits that amount to each primary bettor's account as part of the bet settlement process. As an example assuming Richard receives only two back bets, as outlined in these examples, from the bet he placed in the event, then his total distribution from remuneration bets equals $2.66+$1.66=$4.32. The $2.66 is derived as described above in connection with TABLE 16, and the $1.66 from TABLE 18 above.

Figure 18:
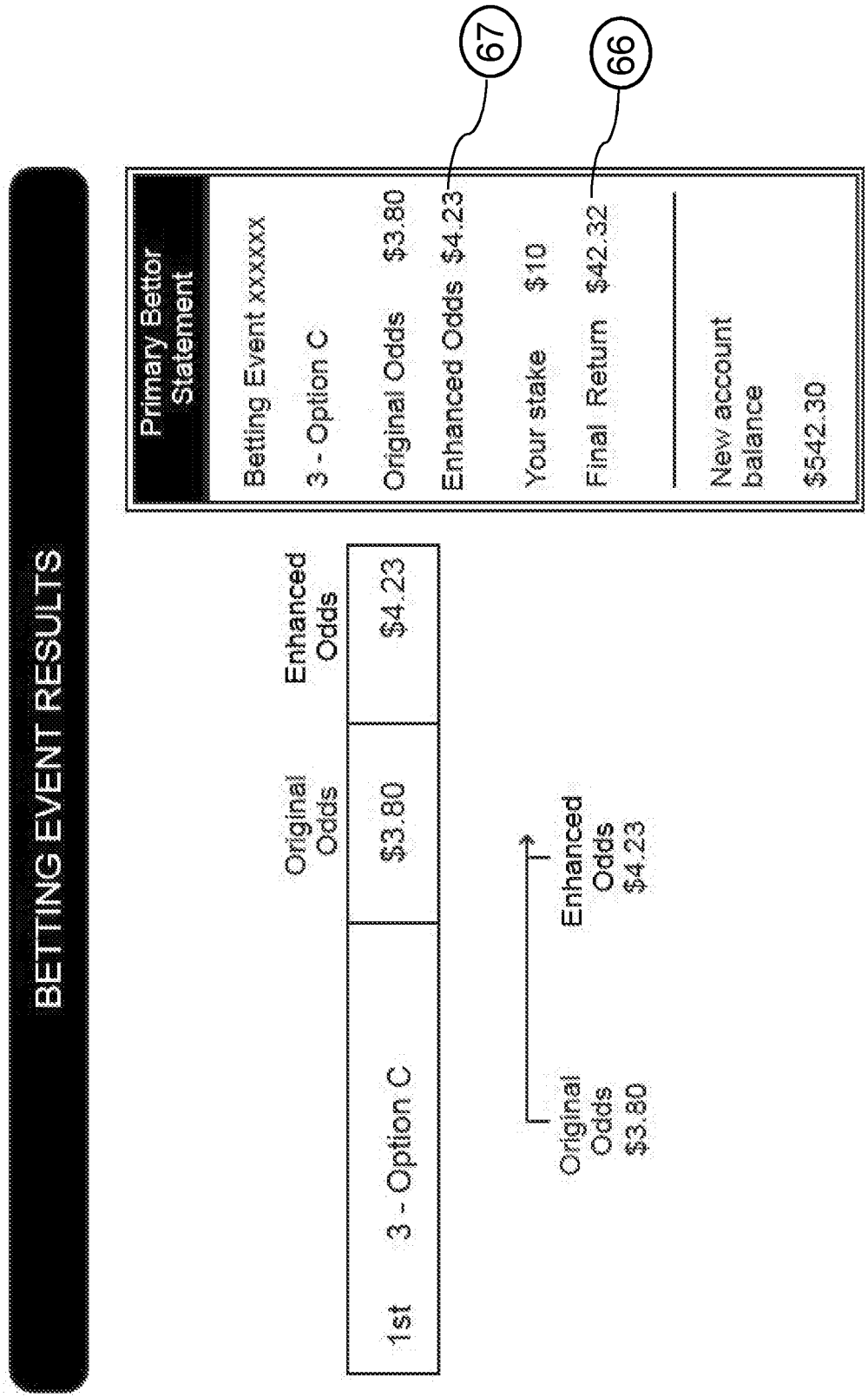

FIG. 18 depicts a screen indicating a final settlement for Richard crediting his account, updating his statement and his account balance.

The $4.32 distributed from the two back bets together with the $38 (FIG. 16 ref 64) returned from his own staked bet equates to a total return of $42.32 (FIG. 18 ref 66). As such his enhanced odds equate to $42.32/$10=$4.232 (FIG. 18 ref 67)

If a primary bettor 110 places a virtual bet, that is confirms their bet information without committing actual funds to bet on the selection, the total of all remuneration bets accumulated and credited to the primary bettor 110 are shown as a total credit amount in their account and indicative odds if they would have placed a $1 bet.

Bettor Profit History, which is used to advertise bets, is updated for all settled bets from primary bettors except bets or virtual bets where the primary bettor has back bet in the same event.

Commit to Future Bets

A secondary bettor 120 can view a primary bettor's betting profit (FIG. 19 ref 70) and can place bets on selections contained within a primary bettor's future bets by filling in and actioning an on-line form (FIG. 19 ref 69) (FIG. 6A step s2-*f*). The secondary bettor enters the number of consecutive bets and the stake to place on each bet. Other rules may also be used to control how winnings are automatically re-invested as future bets. The server 1 checks if the secondary bettor 120 has sufficient funds in her account to pay for the total amount of all stakes entered for the sequence of future bets. If there are sufficient funds in her account and each individual stake amount is greater than the minimum bet amount, the server creates a credit note for the total invested amount and confirms that the bet requests have been queued in the system. If there are insufficient funds in her account she is taken to a deposit screen to deposit funds and after the requisite funds are deposited, processes the request through the steps outlined above.

These future back bets are written to a Future Bets queue file in the server where bets are filed according to the primary bettor who is being back bet and the order sequence that the bet will be placed. This file stores the secondary bettor identifier and the stake amount on the bet in sequence. This file is checked by the server when a primary bettor returns to the server at a future time to place their bets. Consider the example of TABLE 19 below.

TABLE 19

Kerry has invested a total of $60 into Paul's next 3 future bets
($20 per bet)
Don has invested a total of $100 into Paul's next 2 future bets
($50 per bet)
Sue has invested a total of $200 into Paul's next 5 future bets
($40 per bet)
There were no other future bets recorded for Paul The future bet queue for Paul's next 5 bets are as follows in TABLE 20 below.

TABLE 20

| Next Bet | 2nd Next Bet | 3rd Next Bet | 4th Next Bet | 5th Next Bet |
|---|---|---|---|---|
| $110 | $110 | $60 | $40 | $40 |

Place a Bet (as a Future Bet)

This process is similar to the one described in (FIG. 5A step s8) however back bets which are queued future bets are placed by the primary bettor (FIG. 6A step s3-*f*).

When the primary bettor 110 makes a selection from the betting event screen and the betting slip is populated as in FIG. 5A step s8, the server checks to see if there are any future bets scheduled for this bet by reading the details for the next bet in the future bet queue for the primary bettor 110.

Figure 20:
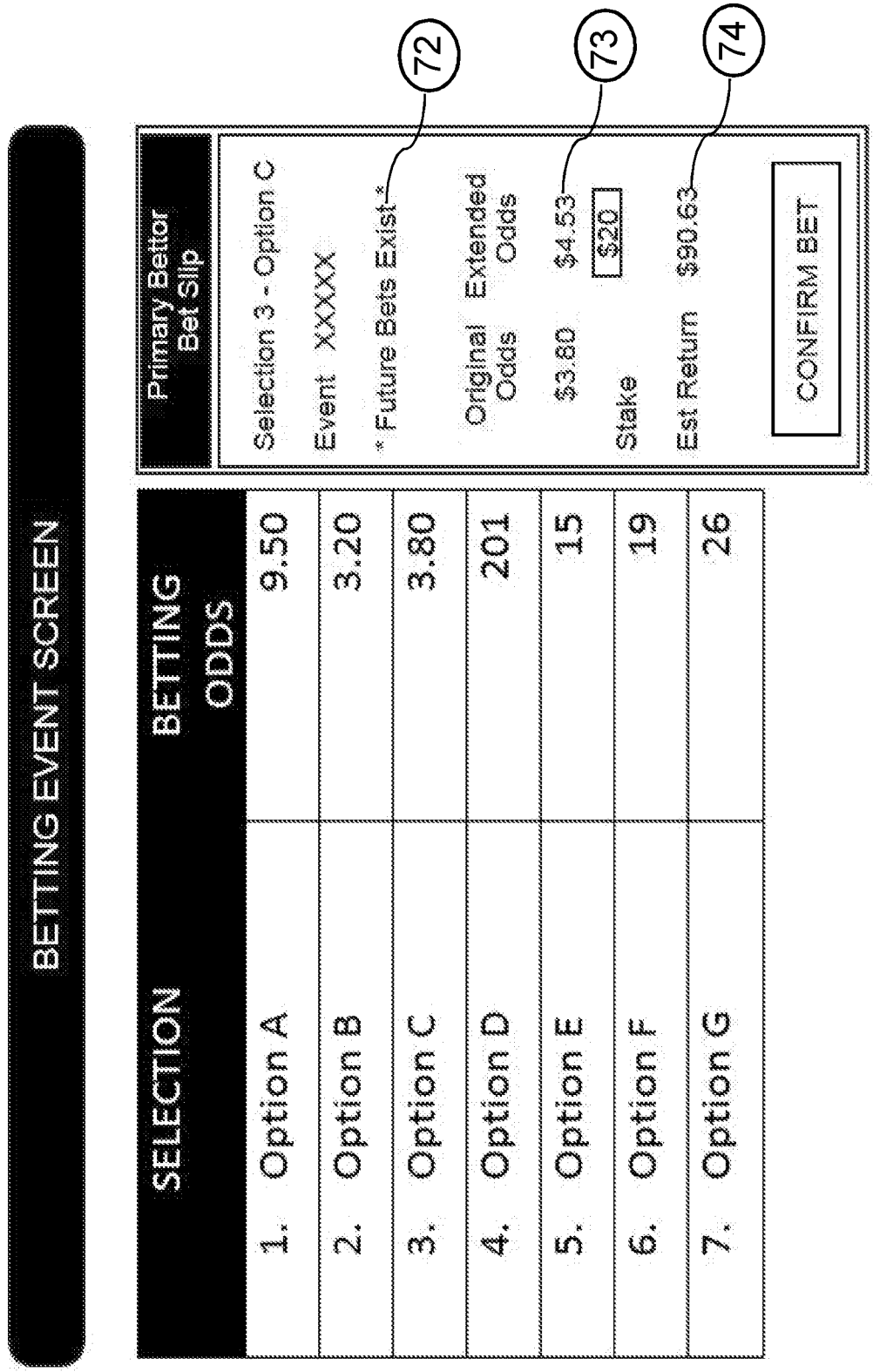

FIG. 20 depicts a screen showing enhanced odds calculated using the future bet investment amount, appearing on the betting slip for the primary bettor 110 with a message indicating secondary bettors 120 have invested in this bet (ref 72). If Paul places a $20 bet on 3—Option C, enhanced odds are calculated and shown on the bet slips using the methodology previously described for the server, and outlined in TABLE 21 below.

TABLE 21

Paul's return from total future bets on his next bet =
$110 × $3.80 × 3.5% = $14.63
Paul's return from his own bet = $20 × $3.80 = $76
Paul's total return = $14.63 + $76 = $90.63 (ref 74)
Paul's enhanced odds = $90.63 / $20 = $4.53 (ref 73)

The primary bettor 110 confirms the betting slip for the bet to be processed and the bet controller 310 transmits the bet to the bet processor 320.

Process Bet (as a Future Bet)

Similar to FIG. 5A step s14, the combined bet amounts for each secondary bettor 120 who invested in the primary bettor's next bet is placed against a generic account in the server 1 on behalf of all secondary bettors 120 who invested in the primary bettor's next bet in the sequence. (FIG. 6A step s4-*f*).

The first bet is placed for the secondary bettors who invested as a future bet.

This example is set out in TABLE 22 below.

TABLE 22

First bet amount = total future bet amount − remuneration bet amount
=$110 − (3.5% × $110)
=$110 − $3.85 = $106.15

The second bet is the primary bettor's bet which includes his own bet stake entered into the betting slip for the selection together with the remuneration component of the future bet.

In the example the second bet, Paul's bet, totals $23.85 as indicated in TABLE 23 below.

TABLE 23

Total bet stake = original stake + remuneration bet amount
=$20 + (3.5% × $110)
=$20 + $3.85
=$23.85

The first and second bets are placed through the bet processor 320, a receipt is sent to the primary bettor 110 and the secondary bettor(s) 120 to indicate that the bet is sold.

After the future bet is placed, the future bet queue pointer moves forward one place while preserving the previous bet information in the queue which is accessed during the Settle Bet process to allocate winnings to secondary bettors 120.

It will be appreciated by those skilled in the art that many modifications and variations may be made to the preferred embodiments described herein without departing from the spirit and scope of the invention.

The invention claimed is:

1. A system for enabling collaborative betting comprising a server accessible via an electronic communications network by client devices, the server comprising a processor, controller, database, and a primary bettor interface and a secondary bettor interface, the controller operatively interacting with the primary bettor interface and the secondary bettor interface to execute steps using the processor in conjunction with the database, the server configured to execute the steps of:
   transmitting to the secondary bettor interface back bet offers, the back bet offers indicating only limited data fields regarding primary bets associated with the respective back bet offers;
   receiving from the secondary bettor interface an indication of acceptance of one of the back bet offers transmitted to the secondary bettor interface; and
   in response to acceptance of the back bet offer received from the secondary bettor interface:
      recording a credit note reserving available funds against an account of the secondary bettor, the credit note being a predetermined minimum amount associated with the accepted back bet offer; and
      transmitting to the secondary bettor interface further data fields indicating a betting selection of the primary bet with which the accepted back bet offer is associated, the further data fields representative of a betting slip for confirmation by the secondary bettor;
   wherein the credit note reserves funds in the amount of the predetermined minimum amount in the account of the secondary bettor.

2. The system according to claim 1, wherein the server is configured to execute the further step of receiving confirmation from the secondary bettor interface of a transaction based upon the betting slip transmitted to the secondary bettor interface.

3. The system according to claim 1, wherein the credit note is structured to be discharged only against an account of the secondary bettor in credit of a transaction confirming the betting slip transmitted following acceptance of the back bet offer for which the credit note was generated.

4. The system according to claim 1, wherein the limited data fields associated with the back bet offer comprise one or more data fields selected from the group comprising: primary bettor, betting event, primary bettor profit history, and minimum stake amount.

5. The system according to claim 1, wherein the limited data fields associated with the back bet offer omit a data field of betting selection.

6. The system according to claim 1, wherein the further data fields representative of the betting slip comprise at least a data field of betting selection, and optionally one or more data fields selected from the group comprising: minimum stake amount, betting event, primary bettor, and bet type.

7. The system according to claim 1, wherein the server is configured to execute the further steps of receiving confirmation from the secondary bettor interface of a transaction based upon the betting slip transmitted to the secondary bettor interface receiving confirmation of the back bet offer, processing the back bet on behalf of the secondary bettor, and settling the processed bet in an account of the secondary bettor.

8. The system according to claim 1, wherein the server is configured to execute the further steps of processing the back bet transmitted to the secondary bettor interface in the amount of the minimum stake amount in the absence of receiving confirmation of the transmitted betting slip.

9. The system according to claim 8, the server configured to execute the further step of co-processing with the back bet a separate remuneration bet based upon the back bet.

10. The system according to claim 9, wherein the server is configured to execute the further step of settling the co-processed remuneration bet in an account of the primary bettor responsible for the primary bet from which the back bet offer was generated.

11. The system according to claim 7, wherein a remuneration bet is made in an amount which is a predetermined fraction of the amount of the back bet.

12. The system according to claim 1, wherein the server is configured to execute the further step of generating back bet offers based upon processing respective individual stored primary bets indexed in the database.

13. The system according to claim 1, wherein the server is configured to execute the further step of generating back bet offers based upon processing an amalgam of primary bets indexed in the database representing a consensus bet from multiple primary bettors.

14. The system according to claim 1, wherein the server is configured to execute the further step of generating back bet offers based upon processing respective individual stored primary bets indexed in the database; wherein the server is configured to execute the further step of generating back bet offers based upon processing an amalgam of primary bets indexed in the database representing a consensus bet from multiple primary bettors; and wherein the consensus bet is identified based upon predetermined criteria applied to the primary bettors or the betting selections made by the primary bettors.

15. The system according to claim 14, wherein the server is configured to execute the further step of settling the processed bet in accounts of the primary bettors contributing to the consensus bet.

16. The system according to claim 10, wherein the received primary bets stored in the database are indexed to include data fields that include: a primary bettor id, an event id, a primary bettor selection id, and a stake amount.

17. A system for enabling collaborative betting comprising a server accessible via an electronic communications network by client devices, the server comprising a processor, controller, database, and a primary bettor interface and a secondary bettor interface, the controller operatively interacting with the primary bettor interface and the secondary bettor interface to execute steps using the processor in conjunction with the database, the server configured to execute the steps of:
   transmitting to the secondary bettor interface back bet offers, the back bet offers indicating only limited data fields regarding anticipated future primary bets associated with the respective back bet offers;
   receiving from the secondary bettor interface an indication of acceptance of one of the back bet offers transmitted to the secondary bettor interface; and
   in response to acceptance of the back bet offer received from the secondary bettor interface:
      recording a credit note reserving funds against an account of the secondary bettor, the credit note being an amount specified by the secondary bettor equal to or greater than a predetermined minimum amount associated with the accepted back bet offer;
      receiving from the primary bettor interface the anticipated future primary bet; and
      scheduling for processing the future primary bet and accepted back bet based upon the future primary bet.

18. The system according to claim 17, the server configured to execute the further steps of processing on behalf of the secondary bettor the accepted back bet offer, and processing on behalf of the primary bettor the future primary bet and a remuneration bet based upon the accepted back bet, wherein the remuneration bet is made in an amount which is a predetermined fraction of the amount of the back bet.

19. The system according to claim 8, the server configured to execute the further step of co-processing with the back bet a separate remuneration bet based upon the back bet.

* * * * *